US008678679B2

United States Patent
Xu

(10) Patent No.: US 8,678,679 B2
(45) Date of Patent: Mar. 25, 2014

(54) SYSTEMS AND DEVICES FOR SECURING AND SECURELY TRANSPORTING A CAMERA

(71) Applicant: Ye Xu, Bellaire, TX (US)

(72) Inventor: Ye Xu, Bellaire, TX (US)

(*) Notice: Subject to any disclaimer, the term of this patent is extended or adjusted under 35 U.S.C. 154(b) by 0 days.

(21) Appl. No.: 13/664,523

(22) Filed: Oct. 31, 2012

(65) Prior Publication Data

US 2013/0101280 A1    Apr. 25, 2013

Related U.S. Application Data

(63) Continuation-in-part of application No. 13/349,200, filed on Jan. 12, 2012, which is a continuation-in-part of application No. 13/317,576, filed on Oct. 21, 2011.

(51) Int. Cl.
*G03B 17/00* (2006.01)
*A45F 3/04* (2006.01)

(52) U.S. Cl.
USPC .......................................... 396/423; 224/639

(58) Field of Classification Search
USPC .......... 396/419, 420, 423; 224/150, 157, 158, 224/160, 580–583, 651, 191, 637–639
See application file for complete search history.

(56) References Cited

U.S. PATENT DOCUMENTS

| 817,207 A | 4/1906 | Wheeler |
| 2,130,262 A | 9/1938 | Burlin |
| 2,135,988 A | 11/1938 | Nagel |
| 2,190,268 A | 2/1940 | Magid |
| 2,480,662 A | 8/1949 | McKinzie |
| 3,559,853 A | 2/1971 | Strassman |
| 3,602,409 A * | 8/1971 | Kerns ........................... 224/258 |
| 4,136,726 A | 1/1979 | Lee |
| 4,328,917 A | 5/1982 | Reeberg |
| 4,396,137 A | 8/1983 | Benjamin |

(Continued)

FOREIGN PATENT DOCUMENTS

| JP | 2003-009930 | 1/2003 |
| JP | 2004320695 A | 11/2004 |

(Continued)

OTHER PUBLICATIONS

Web advertisement, Get HOOKed! from www.leicagoodies.com/lehook.html, Jan. 9, 2013.

(Continued)

*Primary Examiner* — Clayton E Laballe
*Assistant Examiner* — Minh Phan
(74) *Attorney, Agent, or Firm* — Benjamin Aaron Adler

(57) ABSTRACT

Provided herein are systems for engaging and transporting a camera, particularly a camera having a removable lens attached thereto. The systems generally comprise a combination of two adjustable straps working in concert. Particularly, a first adjustable strap comprises means to engage the removable lens, such as a ball connector/strap receiving component, a shoulder pad end and a strap end connected via a safety buckle and a slide disposed on the strap end. Optionally, in the system, the ball connector may be threaded to a mount plate which is threaded to the removable lens. The shoulder pad end has a connecting ring to removably connect the second adjustable strap that comprises a first adjustable strap part with a slide and a second strap part with a means for engaging the camera connectable by a safety buckle. Also provided is an adjustable camera strap comprising the second adjustable strap as described herein.

19 Claims, 26 Drawing Sheets

(56) References Cited

U.S. PATENT DOCUMENTS

| | | | |
|---|---|---|---|
| 4,461,411 A * | 7/1984 | Harrow | 224/617 |
| 4,572,633 A | 2/1986 | Burke | |
| 4,768,689 A | 9/1988 | Davis | |
| 4,868,954 A | 9/1989 | Kasai | |
| 5,065,919 A | 11/1991 | Sims | |
| 5,248,176 A | 9/1993 | Fedriksson | |
| 7,814,697 B2 | 10/2010 | Esch | |
| 7,866,899 B2 | 1/2011 | Kope | |
| 8,047,729 B2 | 11/2011 | Kope | |
| 2006/0208016 A1 | 9/2006 | Esch | |
| 2008/0061099 A1 | 3/2008 | Tilby | |

FOREIGN PATENT DOCUMENTS

| | | |
|---|---|---|
| JP | 200565805 A | 3/2005 |
| JP | 2006-136636 | 6/2006 |
| NL | 1019969 | 8/2003 |

OTHER PUBLICATIONS

Neck Strap Attachment for Small Camera, Popular Science, vol. 128, No. 4, Apr. 1936, pp. 86-87.

* cited by examiner

SYSTEMS AND DEVICES FOR SECURING AND SECURELY TRANSPORTING A CAMERA

CROSS-REFERENCE TO RELATED APPLICATIONS

This continuation-in-part application claims benefit of priority under 35 U.S.C. §120 of pending continuation-in-part application U.S. Ser. No. 13/349,200, filed Jan. 12, 2012, which claims benefit of priority under 35 U.S.C. §120 of pending non-provisional application U.S. Ser. No. 13/317, 576, filed Oct. 21, 2011, the entirety of both of which are hereby incorporated by reference.

BACKGROUND OF THE INVENTION

1. Field of the Invention

The present invention relates generally to the fields of photography and camera accessories or equipment. More specifically, the present invention relates to a system for securing and securely transporting a camera while providing ease of access thereto and use thereof.

2. Description of the Related Art

Photographers routinely carry their cameras with them to be ready for any opportune shot that occurs. However, this is often a trade-off between ease of access to the camera and safe and secure transportation thereof. One solution is to affix the camera to a strap, such as is worn over the shoulder and across the chest.

For example, a carabiner-like or other type of hooking or clipping mechanism can clip to a ring on the camera and receive a strap. Alternatively, U.S. Pat. No. 7,866,899 discloses a single coupler which has a threaded end and locknut at one end to screw into the camera and a strap attachment means through which the strap passes at the other end. However, all these types of coupling mechanisms allow the camera to swing and rotate. Moreover, with the coupler disclosed in U.S. Pat. No. 7,866,899 the swinging, twisting and handling the camera undergoes may cause the screw/locknut mechanism to loosen and wear out which leaves the camera unsecured and at risk of dropping. Furthermore, to mount the camera on a tripod or other stand, part or all of the coupling mechanism must be removed first. This is an inconvenience for the photographer and leaves the camera unsecured.

Thus, there is a recognized need in the art for improved means for safely carrying a camera Particularly, the prior art is deficient in systems, devices and methods for safely and securely transporting a camera without having to release the camera from the transport system for use. The present invention fulfills this longstanding need and desire in the art.

SUMMARY OF THE INVENTION

The present invention is directed to a system for camera transport. The system comprises a mount plate with a plurality of threaded openings and a slot therethrough and a strap connector having a connecting end and a strap receiving end configured to slidably receive a strap therethrough, one or more mount plate connectors and a camera connector. The one or more mount plate connectors each have a first threaded end configured to threadably engage one or more of the plurality of threaded openings and a second end configured to connect to the connecting end of the strap connector. The camera connector has a first threaded end configured to threadably engage a threaded camera attachment point on a camera through the slot. In a related invention, the camera transport system further comprises a strap slidably passed through the strap receiving end of the strap connector. In another related invention the camera transport system further comprises a camera threadably engaged with the mount plate through the slot via the threaded camera connector.

The present invention also is directed to a device for engaging a camera for transport thereof. The device comprises a mount plate having four threaded openings and a slot therethrough, a camera connector and at least one ball connector. The camera connector has a size and dimension to threadably engage a camera attachment point on a camera whereby the camera connector is threadably received through the slot. Each of the ball connectors has a first threaded end configured to threadably engage one of the threaded openings through the mount plate and a second ball end. In a related invention the device further comprises a strap connector with a connecting end configured to receive the ball end of the ball connector and with a strap receiving end configured to slidably receive a strap therethrough and the strap slidably passed through the strap receiving end.

The present invention is directed further to a system for engaging and transporting a camera. The system comprises a mount plate having four threaded openings and a slot therethrough, a camera connecting screw, at least one ball connector, a strap connector, a strap and the camera. The camera connecting screw has a size and dimension to threadably engage a camera attachment point on the camera through the slot. The camera connecting screw has a screw head with an upper surface that is level with an upper surface of the mount plate or recessed within the slot when the screw is threadably engaged with the camera attachment point. Each of the ball connectors has a first threaded end configured to threadably engage one of the threaded openings through the mount plate and a second ball end. The strap connector has a connecting socket end configured to receive the second ball end of one of the ball connectors and a strap receiving end configured to slidably receive a strap therethrough. The strap is slidably passed through the strap receiving end and the camera is threadably engaged with the mount plate.

The present invention is directed further still to a device for camera transport. The device comprises means for securely attaching a camera to the device and means for slidably receiving a strap connectable to said camera attaching means. In a related invention the device further comprises a strap slidably passed through a strap receiving means on the strap receiving component.

The present invention is directed further still to a device for engaging a camera for transport thereof. The device comprises a ball connector configured to engage a camera attachment point on the camera and a second ball end and a strap receiving component configured to slidably receive a strap therethrough at a first end and to receive the ball connector at a second end. In a related invention the device further comprises a strap, as described supra.

The present invention is directed further still to a system for engaging and transporting a camera. The system comprises a camera connecting device having a first component configured to threadably engage the camera at a threaded camera attachment point and a second component, which is connected to the first component, that is configured to slidably receive a strap therethrough. The system also comprises the strap that is slidably received by the second component of the camera connecting device and the camera that is threadably engaged with the first component of the camera connecting device. In a related invention the device further comprises a strap, as described supra.

The present invention is directed further still to a system for engaging and transporting a camera with a removable lens. The system comprises, in combination, means for securely engaging the removable lens while attached to the camera and means for securely engaging the camera. Generally, the combination is a first adjustable strap having means for securing a removable camera lens and a second adjustable strap having means for securing the camera with the lens. The second adjustable strap is removably connected to the first adjustable strap.

The present invention is directed further still to a camera strap system. The system comprises a first and second adjustable straps. The first adjustable strap has a shoulder pad end and a strap end connected via a first safety buckle affixed to both of the ends, where the shoulder pad end comprises a connecting ring and the strap end comprises a first slide disposed on the strap end. The second adjustable strap has a first adjustable strap part and a second strap part connected via a second safety buckle affixed to both of the parts. The first adjustable strap part comprises a snap hook removably connected to the connecting ring and a second slide movably disposed on the first adjustable strap part. The second strap part comprises a connecting ring with screw combination.

In a related camera strap system the first adjustable strap further comprises a strap receiving component and a ball connector. The strap receiving component has a strap receiving end, a socket end threaded on an outer surface and a sleeve threaded on an inner surface movably disposed between the ends to threadably engage the outer surface of the socket end in covering relationship, where the second strap end of the first adjustable strap is slidably received through the strap receiving end. The ball connector has a ball end received within the socket end and a threaded end configured to engage an attachment point on a camera or an attachment point on an accessory attached to the camera. In another related camera strap system, there is a mount plate with a plurality of threaded openings and a slot therethrough where the ball connector is threadably received in one of the plurality of threaded openings and the mount plate threadably engages the attachment point via a screw through the slot.

The present invention is directed further still to an adjustable strap for securing a camera. The adjustable strap comprises a first adjustable strap part and a second adjustable strap part. The first adjustable strap part has a snap hook at a first end, a prong component of a safety buckle secured at a second end and a slide disposed on the first strap part in movable relation thereto, such that a length of the first strap part increases or decreases upon movement of the slide thereon. The second adjustable strap part has a prong receiving component of the safety buckle secured via a D-ring to a first end of the second strap part and a D-ring with screw combination secured to a second end of the second strap part configured to threadably engage a camera attachment point. Engaging the prong end with the prong receiving end of the safety buckle forms the adjustable strap.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIGS. 5A-5B depict the camera coupled to the system with the lens facing to the rear and to the front. FIGS. 5C-5D depict the user initially taking hold of the camera prior to raising it to take a picture and the user having raised the camera to his eye to take a picture.

FIG. 9A depicts the camera coupled to the engagement component of the connector with the lens facing to the front. FIG. 9B depicts the user with the camera raised to his eye to take a picture.

FIG. 12A shows the second strap comprising the system. FIG. 12B depicts the strap support system, as worn by a user, secured to both a camera and a long telephoto lens.

FIG. 13A shows one of the straps secured directly to a camera. FIG. 13B shows the lens strap secured to the mount plate which is secured to an attachment point on a camera lens.

DETAILED DESCRIPTION OF THE INVENTION

Figure 1A:
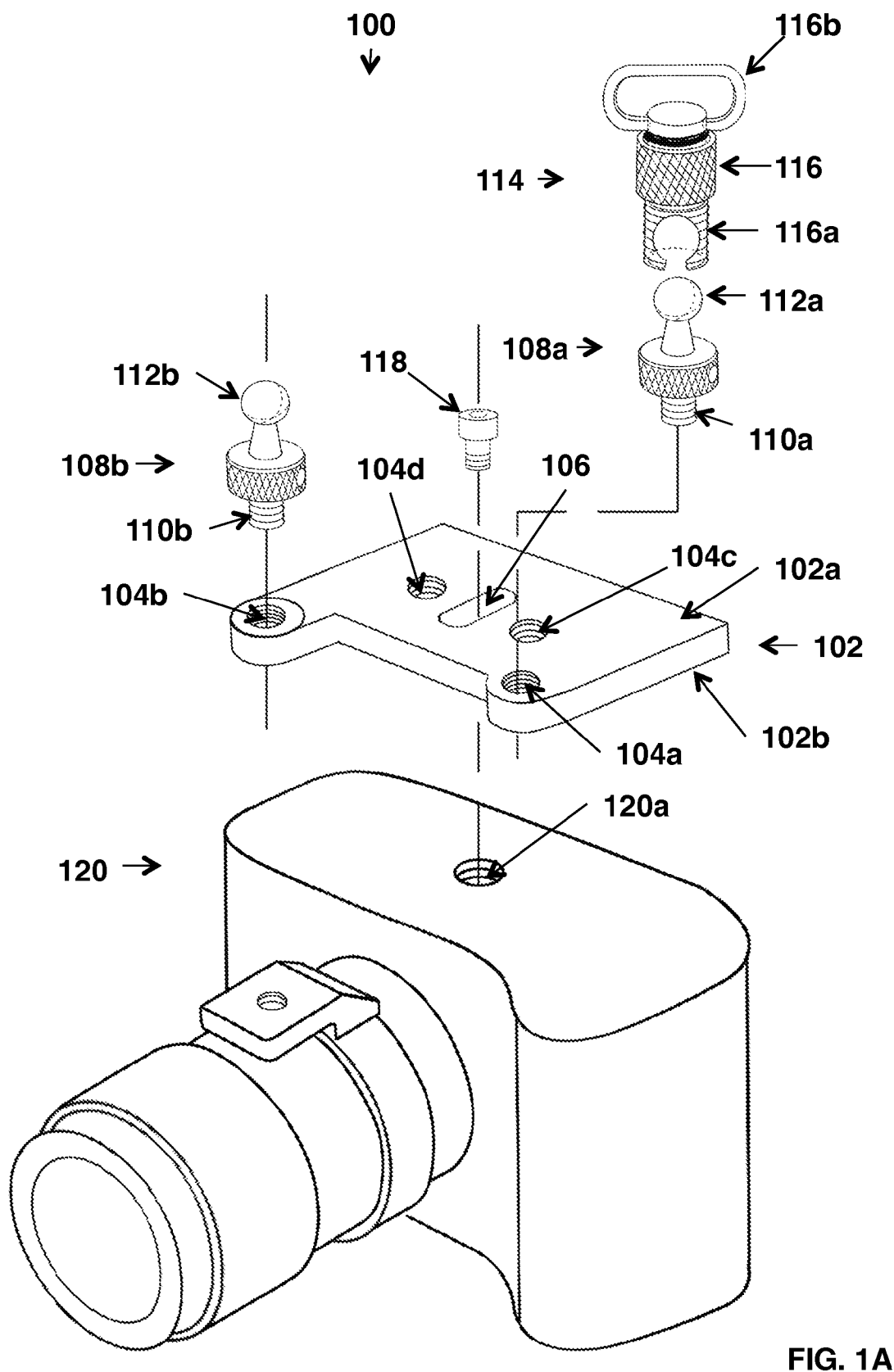
FIGS. 1A-1B are perspective views of an exploded assembly of a camera and mounting plate depicted with first and second ball connectors and strap connector (FIG. 1A) and without the first ball connector and strap connector (FIG. 1B) as aligned with a camera.

As used herein the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention there is provided a system for camera transport, comprising a mount plate with a plurality of threaded openings and a slot therethrough; a strap connector having a connecting end and a strap receiving end configured to slidably receive a strap therethrough; one or more mount plate connectors each having a first threaded end configured to threadably engage one or more of the plurality of threaded openings and a second end configured to connect to the connecting end of the strap connector; and a camera connector having a first threaded end configured to threadably engage a threaded camera attachment point on a camera through the slot.

Further to this embodiment the camera transport system may comprise a strap slidably passed through the strap receiving end of the strap connector. In another further embodiment the camera transport system may comprise a camera threadably engaged with the mount plate through the slot via the threaded camera connector.

In all embodiments the mount plate may have a flat lower surface with a length and a width that are substantially accommodated by a bottom surface of the camera. In one aspect of these embodiments the mount plate slot may be centrally disposed through the mount plate where the mount plate may comprise four mount plate openings. In this aspect two of the mount plate openings may be disposed on either side of the mount plate slot and two of the mount plate openings may be disposed at opposite ends of a front edge of the mount plate. In another aspect of these embodiments the mount plate may comprise one or two ball connectors each having a threaded end and a ball end threadably engaged with one or two threaded mount plate openings; a strap connector with a socket connecting end connected to the ball end of one of the ball connectors and a strap receiving end through which a strap is slidably passed; and a screw configured to threadably engage the threaded camera attachment point through the mount plate slot. In this other aspect the two mount plate openings may be disposed at opposite ends of a front edge of the mount plate.

In all embodiments the one or more mount plate connectors may be ball connectors where the second end comprises a ball configured to connect to the connecting end of the strap connector. As such, the connecting end of the strap connector may be a socket configured to receive a ball end of a ball connector. Also, in all embodiments the camera connector may be a screw having a screw head with a size and dimension whereby an upper surface of the screw head is level with an upper surface of the mount plate or recessed within the slot when the screw is threadably engaged with the camera attachment point.

In another embodiment of the present invention there is provided a device for engaging a camera for transport thereof, comprising a mount plate having four threaded openings and a slot therethrough; a camera connector of a size and dimension to threadably engage a camera attachment point on a camera, said camera connector threadably received through the slot; and at least one ball connector having a first threaded end each configured to threadably engage one of the threaded openings through the mount plate and a second ball end.

Further to this embodiment the device comprises a strap connector having a connecting end configured to receive the ball end of the ball connector and a strap receiving end configured to slidably receive a strap therethrough; and the strap slidably passed through the strap receiving end. In both embodiments the mount plate slot may be centrally disposed through the mount plate. In one aspect two mount plate openings may be disposed on either side of the mount plate slot and two mount plate openings may be disposed at opposite ends of a front edge of the mount plate. Also in both embodiments, the mount plate has a flat lower surface with a length and a width that are substantially accommodated by a bottom surface of the camera.

In yet another embodiment of the present invention there is provided a system for engaging and transporting a camera, comprising a mount plate having four threaded openings and a slot therethrough; a camera connecting screw of a size and dimension to threadably engage a camera attachment point on a camera through the slot, said screw having a screw head with an upper surface that is level with an upper surface of the mount plate or recessed within the slot when the screw is threadably engaged with the camera attachment point; at least one ball connector having a first threaded end each configured to threadably engage one of the threaded openings through the mount plate and a second ball end; a strap connector having a connecting socket end configured to receive the second ball end of one of the ball connectors and a strap receiving end configured to slidably receive a strap therethrough; the strap slidably passed through the strap receiving end; and the camera threadably engaged with the mount plate.

In this embodiment the mount plate slot may be centrally disposed through the mount plate where two of the mount plate openings may be disposed on either side of the mount plate slot and two of the mount plate openings may be disposed at opposite ends of a front edge of the mount plate. Also, the mount plate may have a flat lower surface with a length and a width that are substantially accommodated by a bottom surface of the camera. In an aspect of this embodiment the mount plate may comprise a ball connector threadably engaged with one of the two mount plate openings on the front edge of the mount plate where the strap connector is connected to the ball end of one of the two ball connectors.

In yet another embodiment of the present invention there is provided device for camera transport, comprising means for securely attaching a camera to the device; and means for slidably receiving a strap connectable to said camera attaching means. Further to this embodiment the device may comprise a strap slidably passed through a strap receiving means on the strap receiving component. In a representative example the strap may be adjustable and comprise means for adjusting the length thereof.

In both embodiments the camera attaching means may comprise a camera connecting component of the device which has a first threaded end and a second ball end. A representative example the camera connecting component is a ball connector. Also, in both embodiments the strap receiving means may be a strap receiving component of the device having a strap receiving end, a socket end and a sleeve movably disposed between the ends and configured to cover the socket end. In an aspect of these embodiments the socket end may be threaded on an outer surface and the sleeve may be threaded on an inner surface where the sleeve is configured to threadably engage the threaded socket in a covering relationship.

Alternatively, the device may comprise a strap receiving component with a strap receiving means having a first end configured to slidably receive a strap therethrough and a socket threaded on an outer surface comprising a second end; a camera connecting component having an end configured to engage a threaded camera attachment point and a ball end received within the socket end; and a sleeve threaded on an inner surface and movable between the first and second ends of the strap receiving component and threadably engaging the threaded socket in a covering relationship.

In yet another embodiment of the present invention there is provided device for engaging a camera for transport thereof, comprising a ball connector configured to engage a camera attachment point on the camera and a second ball end; and a strap receiving component configured to slidably receive a strap therethrough at a first end and to receive the ball connector at a second end. Further to this embodiment the device may comprise a strap or an adjustable strap, as described supra.

In both embodiments the ball connector may have a threaded end configured to threadably engage the camera attachment point and a ball end configured for receiving by the second end of the strap receiving component. Also, the strap receiving component may comprise a strap receiving means at the first end, a socket threaded on an outer surface at the second end and a sleeve threaded on an inner surface movably disposed between the first and second ends where the threaded sleeve is configured to threadably engage the threaded socket in a covering relationship upon receiving the ball end of the ball connector within the threaded socket.

In yet another embodiment of the present invention there is provided system for engaging and transporting a camera, comprising a camera connecting device having a first component configured to threadably engage the camera at a threaded camera attachment point and a second component, connected to said first component, configured to slidably receive a strap therethrough; the strap slidably received by the second component of the camera connecting device; and the camera threadably engaged with the first component of the camera connecting device.

In both embodiment the first component may comprise a threaded end and a ball end. A representative example of the first component is a ball connector. Also, in these embodiments the second component may comprise a strap receiving means, a socket threaded on an outer surface and means for securing the connection between the first and second components. In an aspect of this embodiment the means for securing the connection between the first and second components may be a sleeve having threads on an inner surface thereof movably disposed between the strap receiving means and the threaded socket, where the sleeve is configured to threadably engage the threaded socket in a covering relationship upon its connection to the first component. Particularly, the connection between the first and second components may comprise a ball end of a ball connector within the threaded socket. In all embodiments and aspects thereof the strap may be an adjustable strap comprising means for adjusting the length thereof.

In yet another embodiment there is provided a system for engaging and transporting a camera with removable lens, comprising, in combination, means for securely engaging the removable lens while attached to the camera; and means for securely engaging the camera.

In this embodiment the lens engaging means may comprise a first adjustable strap having a shoulder pad end and a strap end connected via a safety buckle, where the shoulder pad end may comprise means for removably connecting to a second strap and the strap end may comprise a slide disposed thereon; a strap receiving component having a strap receiving end, a socket end threaded on an outer surface and a sleeve threaded on an inner surface movably disposed between the ends to threadably engage the outer surface of the socket end in covering relationship, where the second strap end is slidably received through the strap receiving end; and a ball connector having a ball end received within the socket end and a threaded end configured to engage an attachment point on the lens. An example of means for removably connecting to the second strap may be a D-ring. Further to this embodiment the lens engaging means may comprise a mount plate with a plurality of threaded openings and a slot therethrough, where the ball connector is threadably received in one of the plurality of threaded openings and the mount plate threadably engages the lens attachment point via a screw through the slot.

In the lens engaging means, a prong end of the safety buckle may be affixed to the shoulder pad end and a prong receiving end of the safety buckle is affixed to the slide or to a loop formed in a portion of the strap end of the first adjustable strap. In one aspect the prong receiving end of the safety buckle may be affixed to the slide where the strap end of the first adjustable strap is pullable through the slide in a length-adjusting relationship. In another aspect the prong receiving end of the safety buckle may be affixed independently to the loop formed in a portion of the strap end and to the slide, where the slide receives a non-looped portion of the strap end of the first adjustable strap therethrough and where the slide is movable along the non-looped portion in a length-adjusting relationship.

Also for this embodiment the camera engaging means may comprise a second adjustable strap having a first adjustable strap part and a second strap part connected via a safety buckle, where the first adjustable strap part comprises a slide movably disposed along the same in a length-adjusting relationship; means for removably connecting the first adjustable strap part to the first adjustable strap; and means for removably connecting the second strap part to an attachment point on the camera or on an accessory, for example, a camera hand grip, attached to the camera attachment point. Particularly, a prong end of the safety buckle may be affixed to a second end of the first adjustable strap part and a prong receiving end of the safety buckle may be affixed to a first end of the second strap part. In addition, the means for removably connecting to the first adjustable strap may be a snap hook affixed at a first end of the first adjustable strap part. Furthermore, the means for removably connecting to the attachment point may be a D-ring with screw affixed at a second end of the second strap part.

In yet another embodiment there is provided a camera strap system, comprising a first adjustable strap having a shoulder pad end and a strap end connected via a first safety buckle affixed to both of said ends, said shoulder pad end comprising a connecting ring and said strap end comprising a first slide disposed on the strap end; and a second adjustable strap having a first adjustable strap part and a second strap part connected via a second safety buckle affixed to both of said parts, said first adjustable strap part comprising a snap hook removably connected to the connecting ring and a second slide movably disposed on the first adjustable strap part and said second strap part comprising a connecting ring with screw combination.

In this embodiment a prong end of the first safety buckle may be affixed to the shoulder pad end of the first adjustable strap and a prong receiving end of the first safety buckle may be affixed to the first slide or to a loop formed in a portion of the strap end of the first adjustable strap. In one aspect the prong receiving end of the first safety buckle is affixed to the first slide, where the strap end of the first adjustable strap is pullable through the first slide in a length-adjusting relationship. In another aspect the prong receiving end of the first safety buckle may be affixed independently to the loop formed in a portion of the strap end and to the first slide, where the first slide receives a non-looped portion of the strap end of the first adjustable strap therethrough and where the first slide is movable along the non-looped portion in a length-adjusting relationship. Also, a prong end of the second safety buckle may be affixed to a second end of the first adjustable strap part and a prong receiving end of the safety buckle may be affixed to a first end of the second strap part.

In a further embodiment the first adjustable strap may comprise a strap receiving component having a strap receiving end, a socket end threaded on an outer surface and a sleeve threaded on an inner surface movably disposed between the ends to threadably engage the outer surface of the socket end in covering relationship, where the second strap end of the first adjustable strap is slidably received through the strap receiving end; and a ball connector having a ball end received within the socket end and a threaded end configured to engage an attachment point on a camera or an attachment point on an accessory attached to the camera. An example of an accessory is a lens or a camera handgrip.

In yet another embodiment there is provided an adjustable strap for securing a camera, comprising a first adjustable strap part having a snap hook at a first end, a prong component of a safety buckle secured at a second end and a slide disposed on the first strap part in movable relation thereto, such that a length of the first strap part increases or decreases upon movement of the slide thereon; and a second strap part having a prong receiving component of the safety buckle secured via a D-ring to a first end of the second strap part and a D-ring with screw combination secured to a second end of the second strap part configured to threadably engage a camera attachment point; wherein engagement of the prong end with the prong receiving end of the safety buckle forms said adjustable strap.

Provided herein are devices and systems for carrying or transporting a camera. In one system a camera mount plate device is utilized as a means to engage a camera at an attachment point generally used for mounting the camera onto a tripod or other stand. Moreover, the mount plate comprises separate means for engaging the camera and for slidably receiving a strap for carrying the same. This provides a more secure and safe method of transport without interfering with use of the camera by a user while allowing the camera to be comfortably positioned against the user either at rest or during transport. Furthermore, the secured camera may be mounted onto a tripod or other stand without having to disengage the camera from the mount plate.

In a related camera carrying or transporting system, the means for slidably receiving the strap to carry the camera is utilized to directly engage the camera at the attachment point without the camera mount plate device. Particularly, a device comprising a camera connecting component and a strap receiving component can engage a camera at the camera attachment point. The two components comprising the camera engagement device are joined via a ball in socket assembly, such as in a ball connector. When the strap receiving component has a strap slidably received therethrough, the assemblage comprises a camera transport system.

One advantage of this type of camera transport system is that, utilizing a ball and socket assembly, the attached camera can be rotated to a position suitable and comfortable for a particular user either at rest or during transport of the camera and without interfering with a user's ability to quickly take advantage of a photographic opportunity. Moreover, moving, swinging or rotating the camera via the ball and socket assembly eliminates any rotational forces or torque that would loosen the camera connecting component from the camera attachment point. This enables the safe transport and use of the camera.

The present invention also provides strap connection systems comprising multiple straps for securing and transporting a camera with lens attached, for example, but not limited to, a large telescopic lens. Particularly, the connection system comprises two adjustable straps. The first strap may be any of the adjustable straps described herein which is secured to a lens on the camera. The second strap also is adjustable and is designed to be securable to the first adjustable strap at one end and to a camera or to an accessory, such as but not limited to, a camera hand grip, via the attachment points on the same.

Each strap has an adjustment component comprising a slide or, for the first strap, a slide with a pull attached. The adjustment component is integrated into the strap via a safety buckle, such as a side release buckle or a 3 button release buckle, as are known and standard in the art. The straps may comprise one or more D-rings, snap hooks or closed loops of webbing material and/or cordage as attachment or connection means for securing, inter alia, the straps to each other and/or to the camera or lens, securing the adjustment component to the safety buckle and to other strap components and to securing a pull to a strap end or to a slide.

This combination strap system distributes the weight load from the combination of the camera and lens, particularly, large heavier lenses, for more secure transportation. Moreover, the two straps are independently adjustable so that a user wearing the strap combination can adjust the lengths to position the camera and lens to rest against the hips or chest as desired. Furthermore, the strap combination can be adjusted to maintain the camera and lens in a level upside-down position where at least the camera can be easily gripped and raised to the eye for a photographic opportunity.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

Figure 1B:
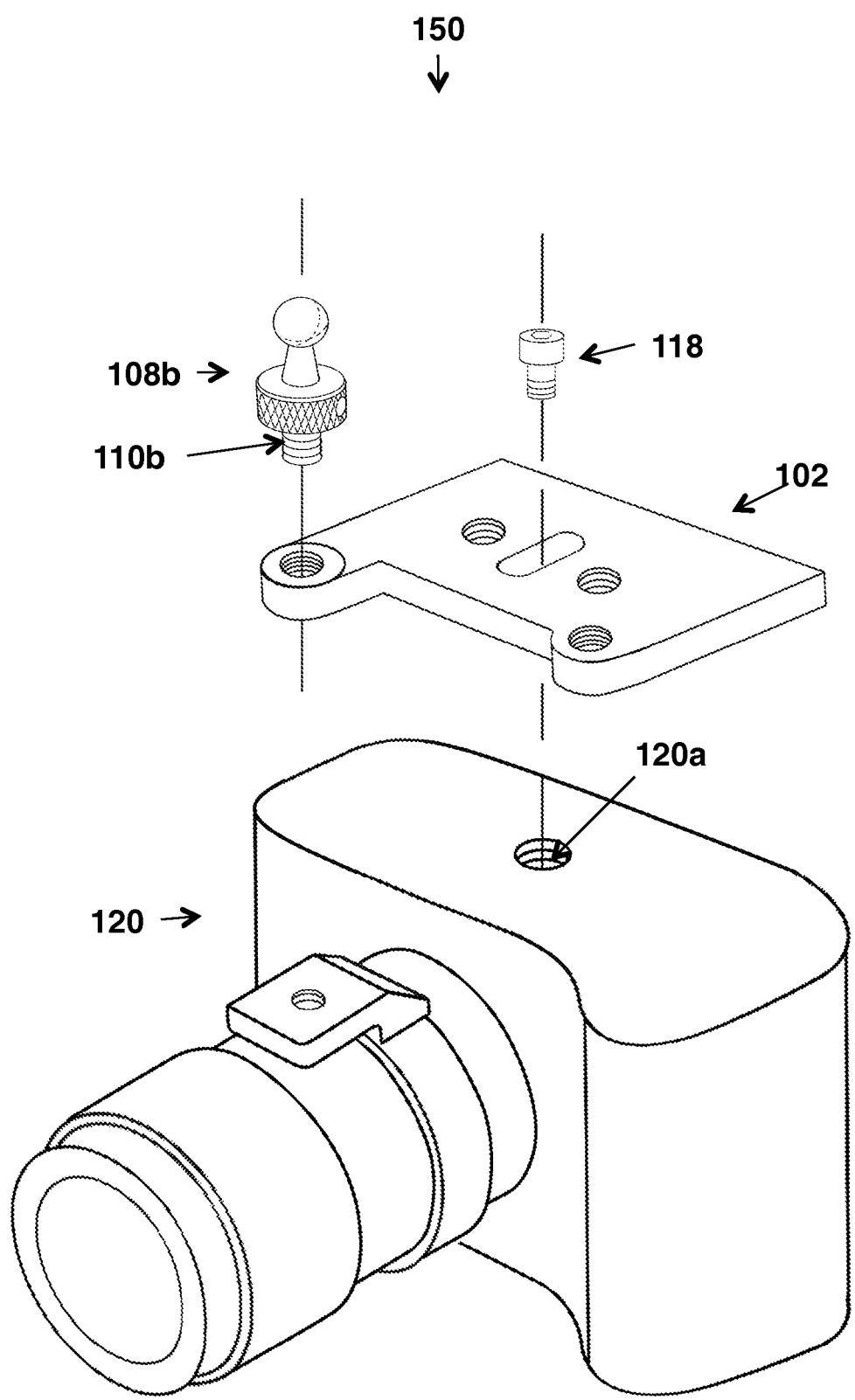

FIG. 1A is an exploded perspective view of the mount plate and the strap connector of the camera transport system 100 as it would be aligned to engage and to secure a camera. A mount plate 102 is shown and has an upper 102a and a lower 102b surface with a plurality of threaded openings 104a,b,c,d and a slot 106 therethrough. Threaded openings 104a,b are disposed at opposite ends of a front edge 102c and threaded opening 104c,d are disposed on either side and proximate to slot 106. First and second ball connectors 108a,b each have a threaded end with nut assembly 110a,b to threadably engage one of the threaded openings in the mount plate and a ball end 112a,b to connect to a strap connector 114. The strap connector comprises a sleeve 116 with a socket 116a configured to receive the ball of the ball connector at a first end and a strap receiving means 116b for slidably passing a strap 202 therethrough (see FIG. 2A) threadably engaged with the sleeve at a second end. A camera connecting screw 118 is configured to threadably engage the threaded camera attachment point 120a on the bottom surface of the camera typically provided for mounting the camera onto a tripod or other stand through the mount plate slot. With continued reference to FIG. 1A, FIG. 1B is an exploded perspective view 150 of the mount plate 102, camera connecting screw 118 and the second ball connector 110b as aligned with threaded camera attachment point 120a on the bottom surface of the camera 120.

The dimensions of the mount plate are determined by the dimensions of the bottom surface of the camera so that the lower surface area of the mount plate is flush with and substantially accommodated by the bottom surface of the camera. For example, although any surface area for the mount plate is encompassed by the invention, a representative areal dimensions of the mount plate may be, but are not limited to, about 7 cm to about 8 cm.

One or more of the ball connectors may be threaded into one or more of the mount plate openings and, when so engaged with the mount plate, the ball connector threaded end is flush with the lower 102b surface of the mount plate 102. Moreover, the strap connector may be connected to any ball connector 110a,b at any mount plate opening 104a,b,c,d. Preferably, the strap connector is connected to a ball connector that is itself threaded into one of the mount plate openings 104a,b. In addition, while the camera transport system described herein provides a secure means of transport that enables quick use of the camera without disengaging or releasing it from the system, including mounting the camera onto a tripod or other stand, a user who knows that the camera will not be used for a period of time, may utilize a second strap as an additional safety feature. For example, a second strap may be passed through the strap attachment end of a second strap connector engaged with a second ball connector on the mount plate. The second strap may hook to a belt loop or loop over a belt. This keeps the camera near the user and limits its motion during transport. Furthermore, the plurality of mount plate openings enables a camera to be simultaneously engaged with the mount plate and with a camera tripod or other stand, as are known in the art.

When the camera connecting screw 118 is threaded through the mount plate slot 106 into the threaded camera attachment point, the top surface of the screw head may be flush with the upper edge of the mount plate slot or recessed therein. This ensures that the screw remains securely fastened and will not be loosen over time. Loosening the camera connecting screw requires a tool, such as, depending on the type of screw head, a screwdriver, Allen wrench or hex key, as are well-known and standard in the art.

Figure 2A:
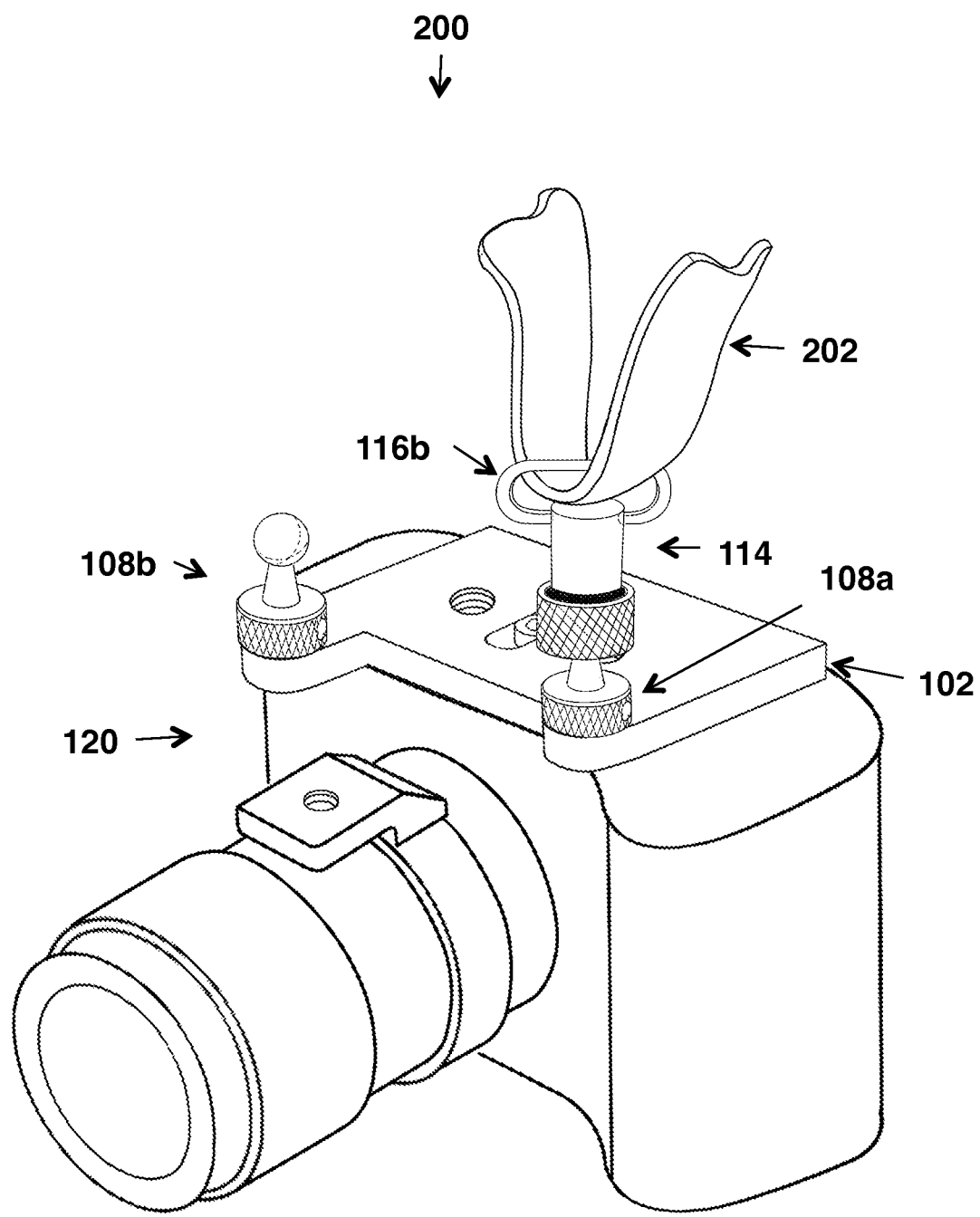
FIGS. 2A-2B are perspective views showing the system of FIG. 1A including a strap through the strap connector assembled via the first ball connector (FIG. 2A) and via the second ball connector (FIG. 2B).
Figure 2B:
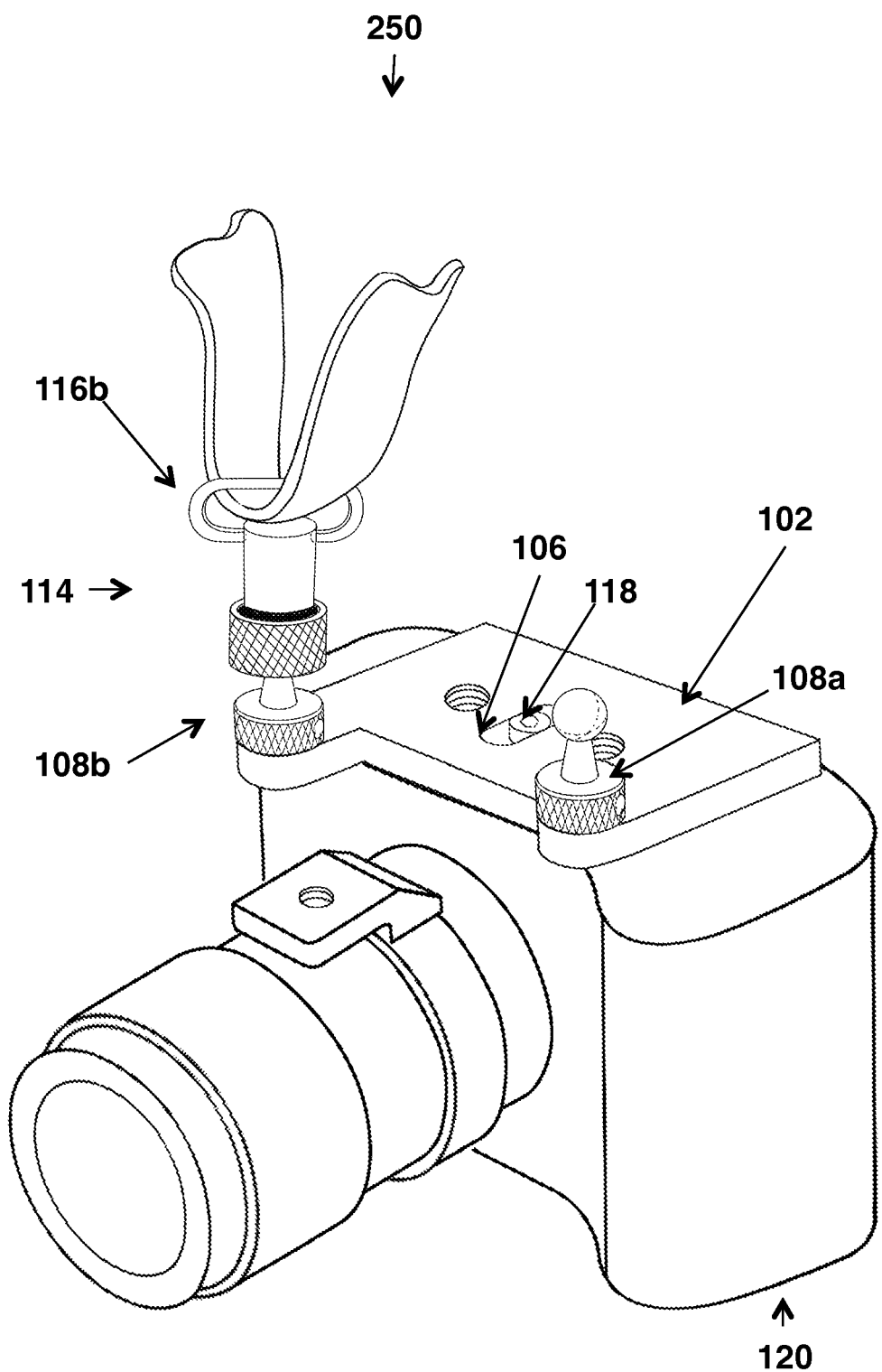

With continued reference to FIG. 1A, FIGS. 2A and 2B are front perspective views 200 and 250 of the assembled camera transport system 100. In these views, the lower surface 102b of the mount plate 102 is threadably engaged and in contact with the bottom surface of the camera 120 via the camera connecting screw 118 which is flush with the mount plate slot 106 as described for FIG. 1A-1B. The mount plate has two ball connectors 108a,b threaded into the mount plate openings 104a,b. A strap connector 114 depicting a portion of strap 202 slidably passing through the strap receiving end 116b is connected to ball connector 108a in FIG. 2A and is connected to ball connector 108b in FIG. 2B.

With continued reference to FIGS. 2A-2B, FIGS. 3A and 3B are perspective views 300 and 350 of the camera transport system in which the complete strap 202 is depicted slidably passing through the strap receiving end 116b of the strap connector 114. The strap connector is connected to ball connector 108a as described in FIG. 2A and is connected to ball connector 108b as described in FIG. 2B. The threadable engagement of the ball connectors 108a,b to the mount plate 102 and of the mount plate to the camera 120 is as described for FIGS. 2A-2B.

Figure 4A:
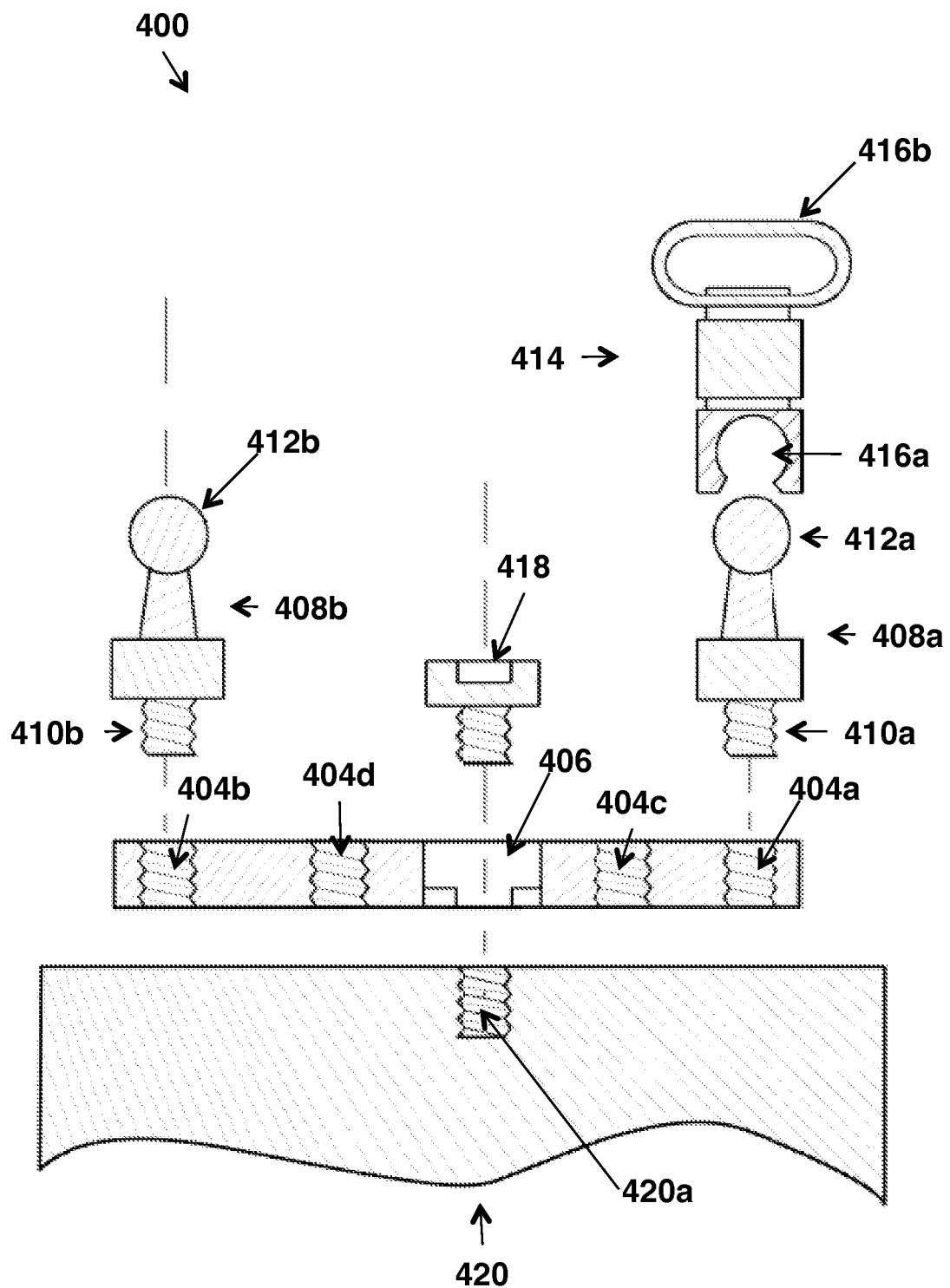
FIGS. 4A-4B are front cross-sectional views of the exploded assembly depicted in FIG. 1A and the perspective view of the assembled system shown in FIG. 2A.

With continued reference to FIG. 1A FIG. 4A is a cross-sectional view of the exploded assembly of the mount plate 402 with components shown in cross-section as aligned for engagement with the camera 420. The cross-section shows the plurality of threaded openings 404a,b.c,d on the mount plate 402 that receive the threaded ends 410a,b of the ball connectors 408a,b. The cross-section also depicts the strap connector 414 sleeve 416 showing the configuration of the socket 416a end to receive the ball end 412a of the ball connector and the configuration of the strap receiving end 416b to slidably receive the strap therethrough.

Figure 4B:
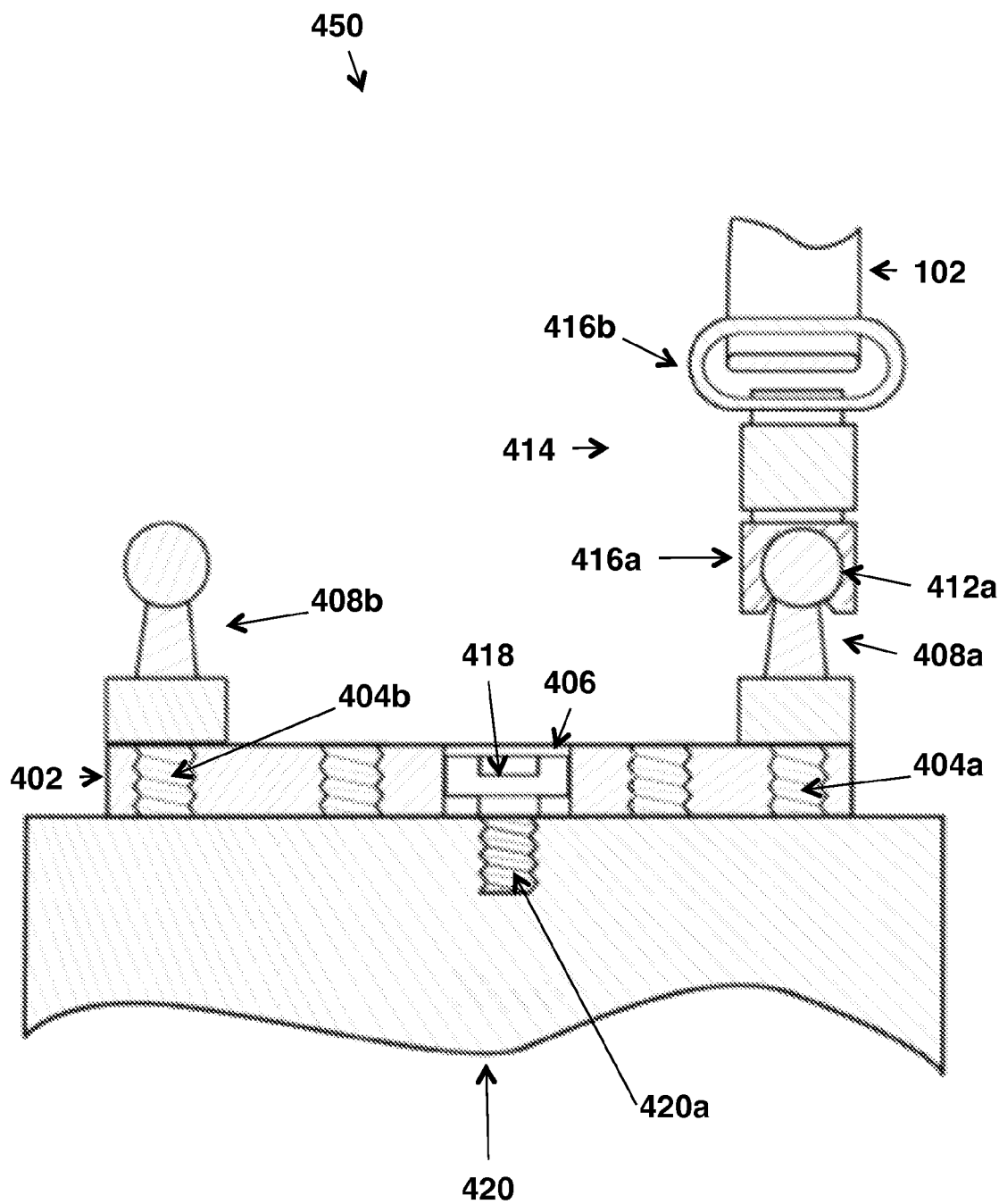

With continued reference to FIG. 2A FIG. 4B is a cross-sectional view 450 of the assembled mount plate 402 engaged with the camera 420. The cross-section shows how the ball connectors 408a,b are threadably received into the mount plate openings 404a,b. The cross-section also shows how the camera connecting screw 418 is threadably received into the camera attachment point 420a of the camera through the mount plate slot 406 and demonstrates that the screw head of the camera connecting screw is recessed within the slot for secure engagement. The cross-section further demonstrates how the ball end 412a of the ball connector 408a is received into the socket 416a of the strap connector 414 sleeve 416 and how a portion of the strap 402 slidably passes through the strap receiving end 416b of the sleeve.

Figure 3A:
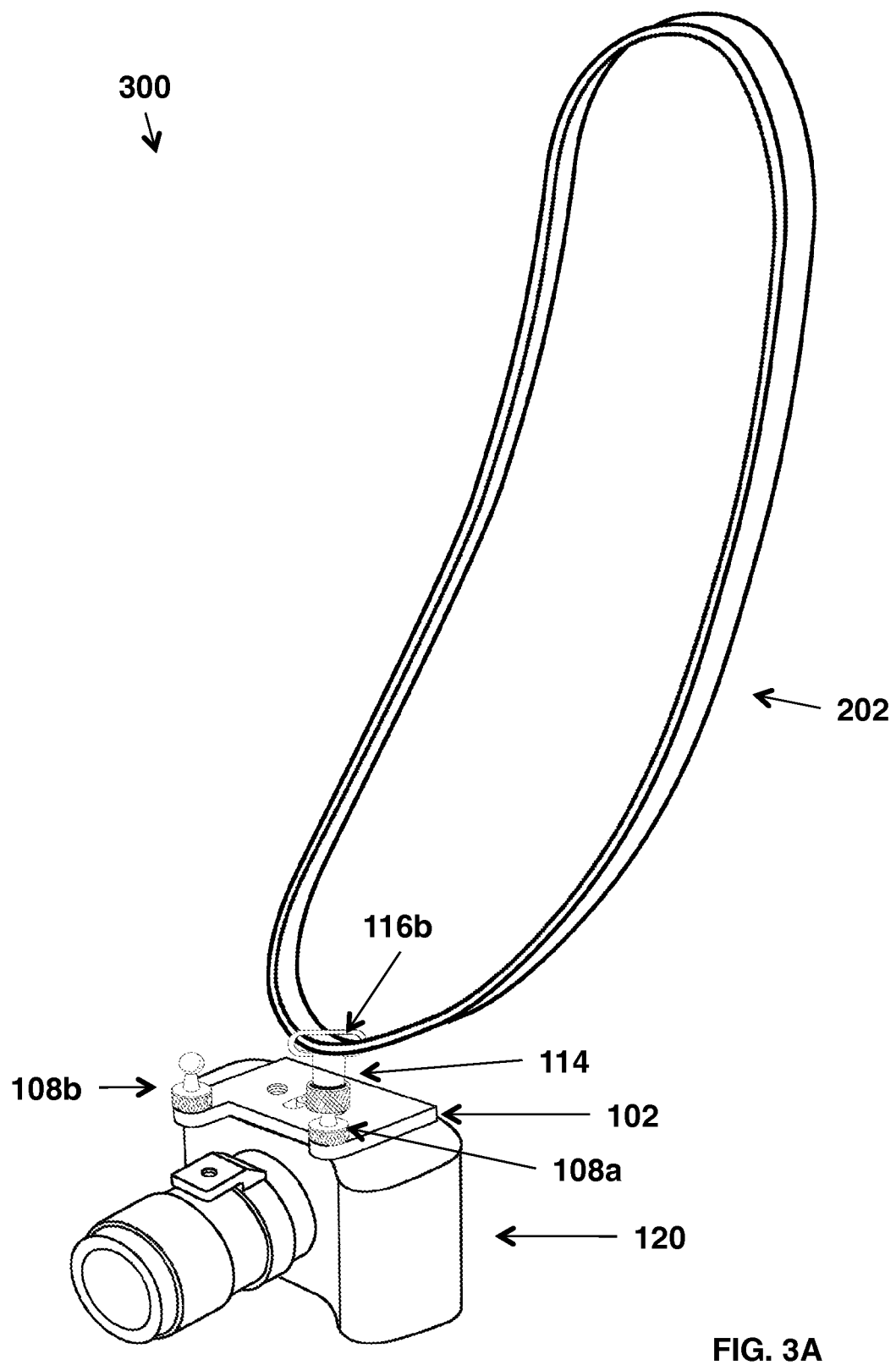
FIGS. 3A-3B are perspective views of FIGS. 2A-2B depicting a complete assembled transport system securing a camera.
Figure 3B:
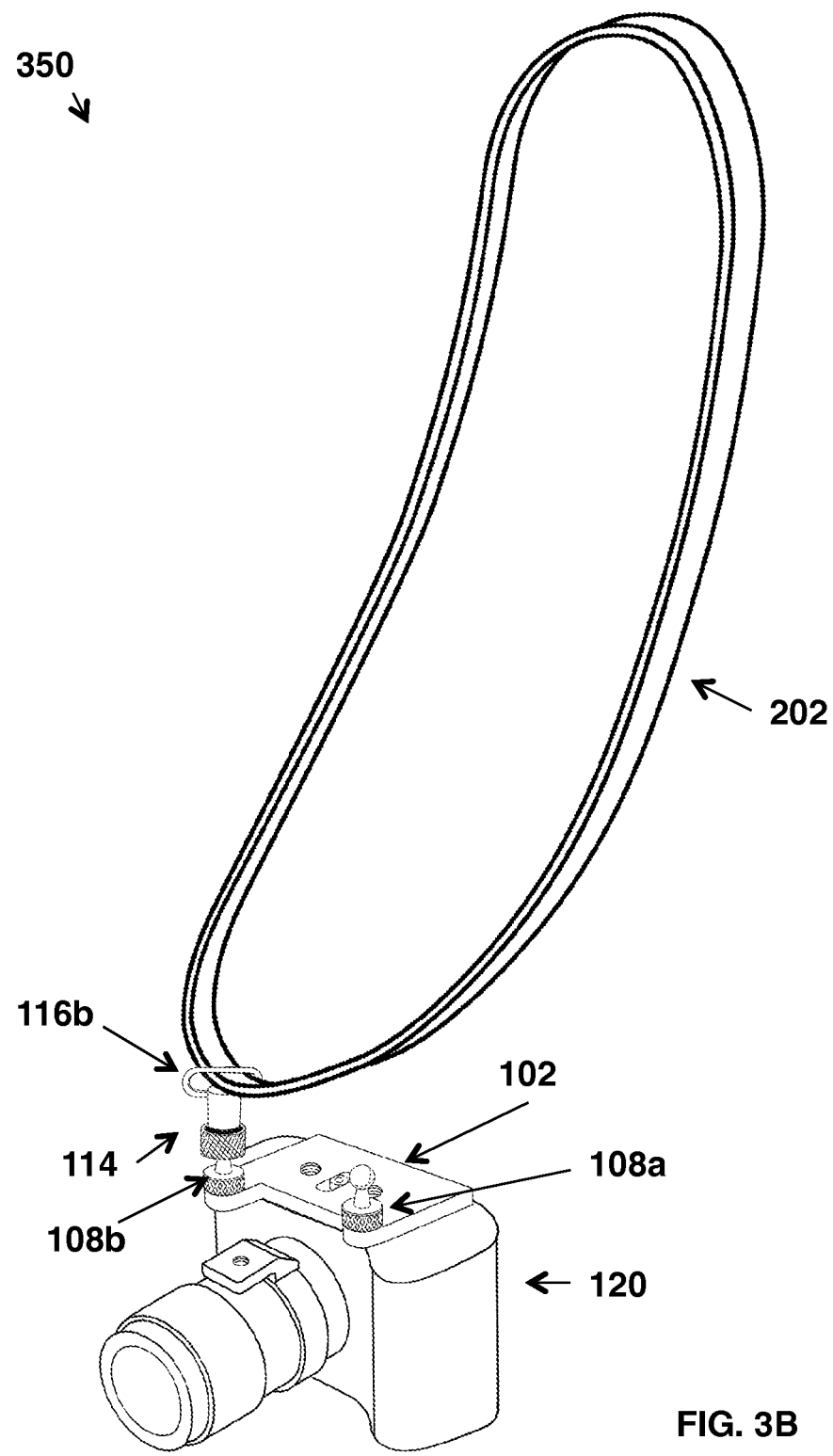

With continued reference to FIGS. 3A-3B, FIGS. 5A-5B depict the camera transport system in front plan views 500a,b, as worn and used by a user 501. The strap 202 may be worn over the shoulder 502a to cross the chest whereby the camera 120 engaged with the mount plate 102 rests in the area of the right hip 504b. The strap slidably passes through the strap receiving end 116b of the strap connector 114 and may be adjusted at 202a, for example, lengthened or shortened, as suits each individual user, so that the camera rests comfortably and securely against the user. Alternatively, the strap 202 may be of an unadjustable length, as shown in FIG. 5D. The camera transport system may engage the camera such that, when worn by the user 501, the camera is rearwardly facing at about hip level 504b at 506a, as in FIG. 5A, or forwardly facing at about hip level 504b at 506b, as in FIG. 5B. Moreover, although the strap connector is depicted connected to the ball end 112b of the ball connector 108b, the ball connector may be engaged with any of mount plate openings 104a, b,c,d. As depicted, the camera transport system is assembled for easier use by a right-handed person. As shown in FIG. 3A, if ball connector 108a is utilized to connect to the strap connector 114, the strap may be worn over shoulder 502b to cross the chest whereby the camera 120 rests against the area of the left hip 504aa of the user.

Figure 5A:
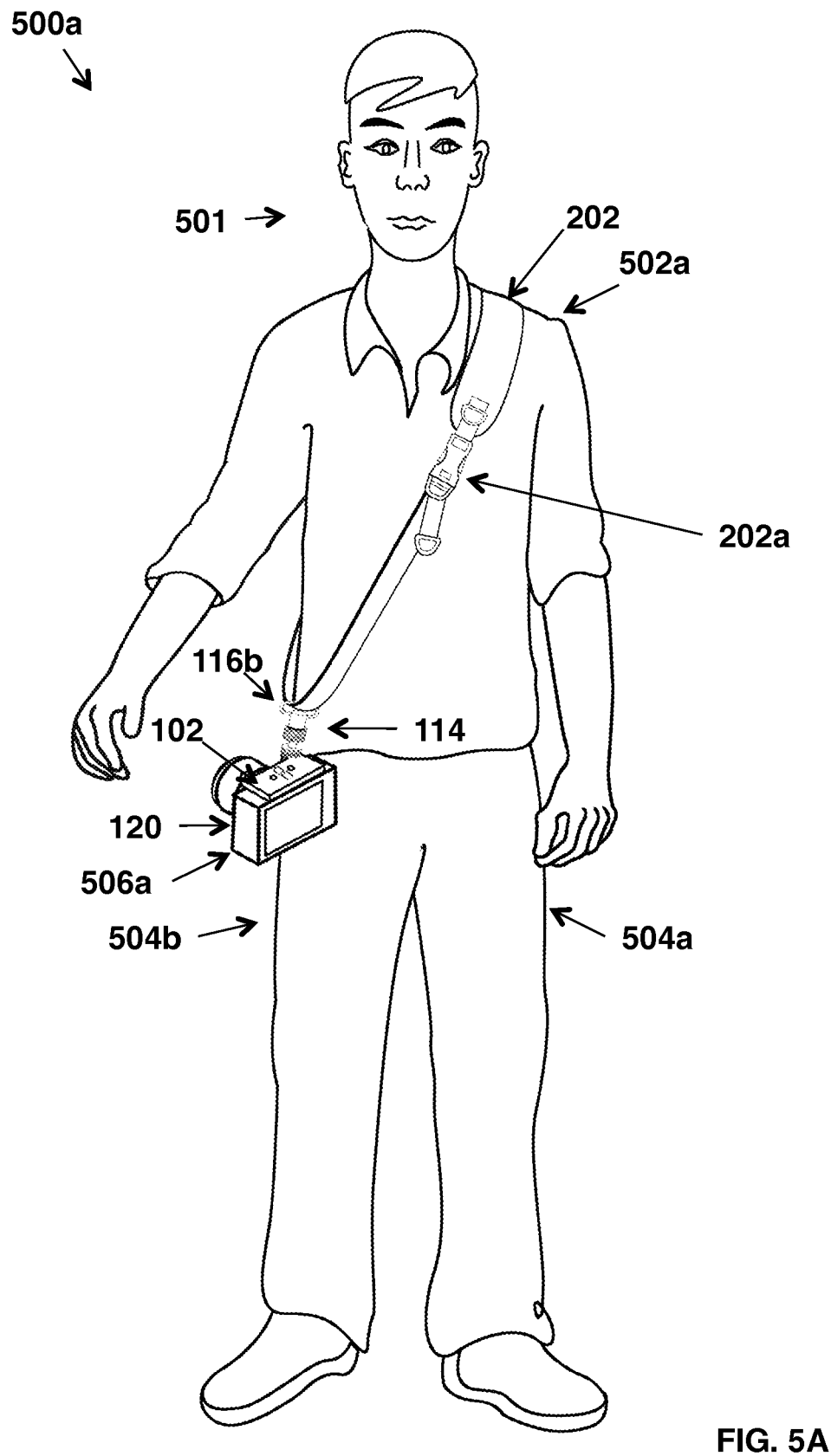
FIGS. 5A-5D depict the camera transport system with camera as worn by a user of the camera.
Figure 5B:
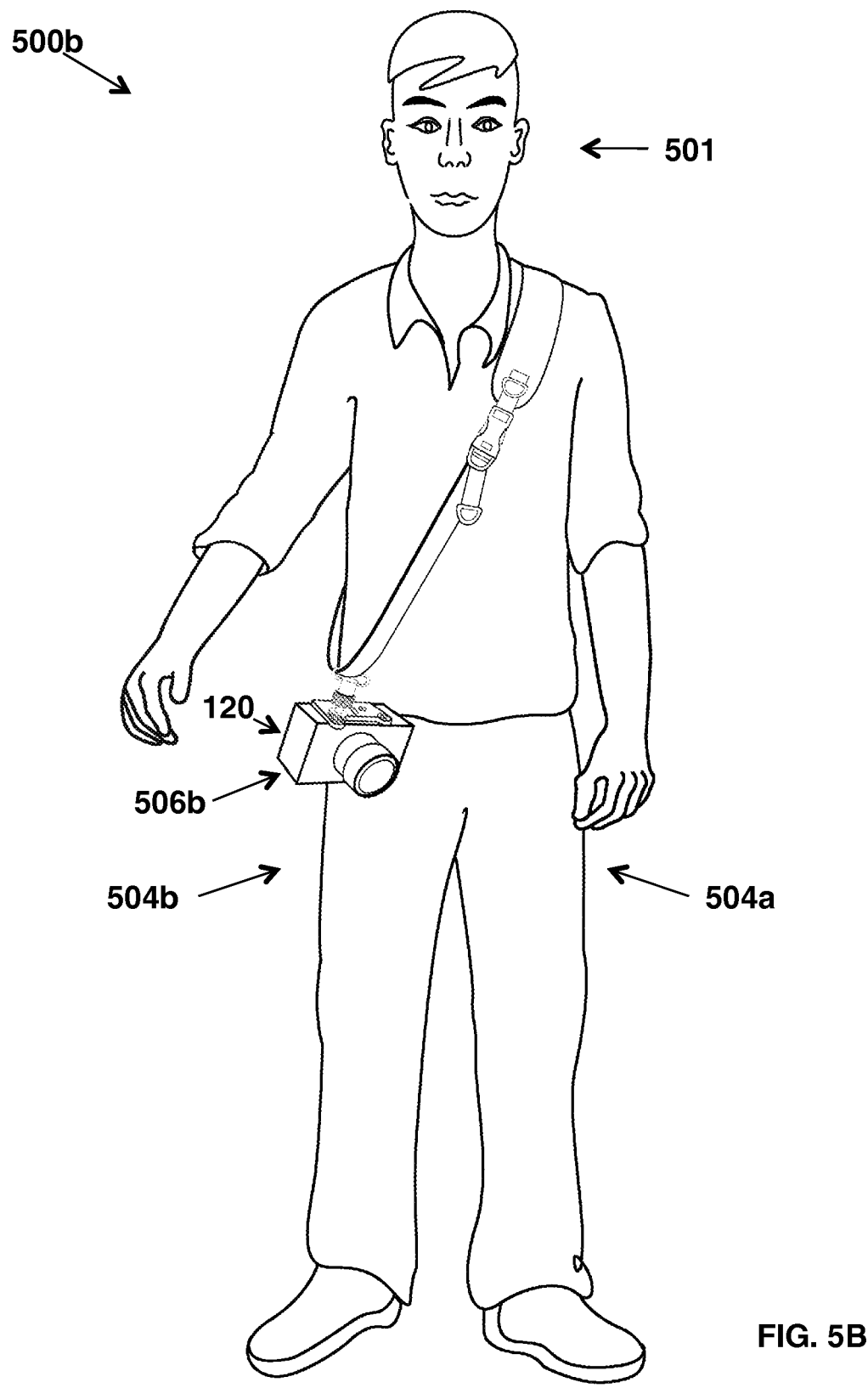
Figure 5C:
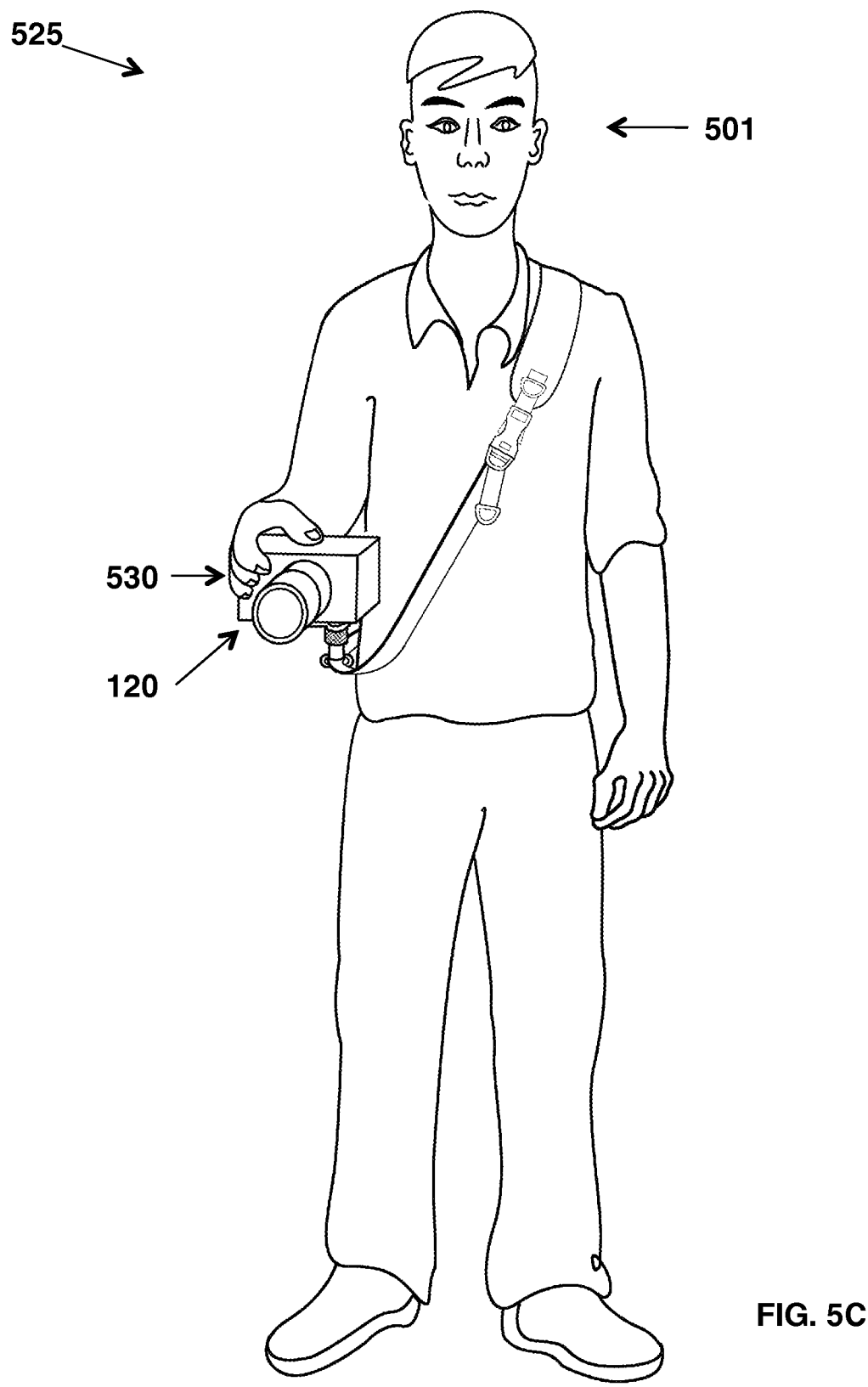
Figure 5D:
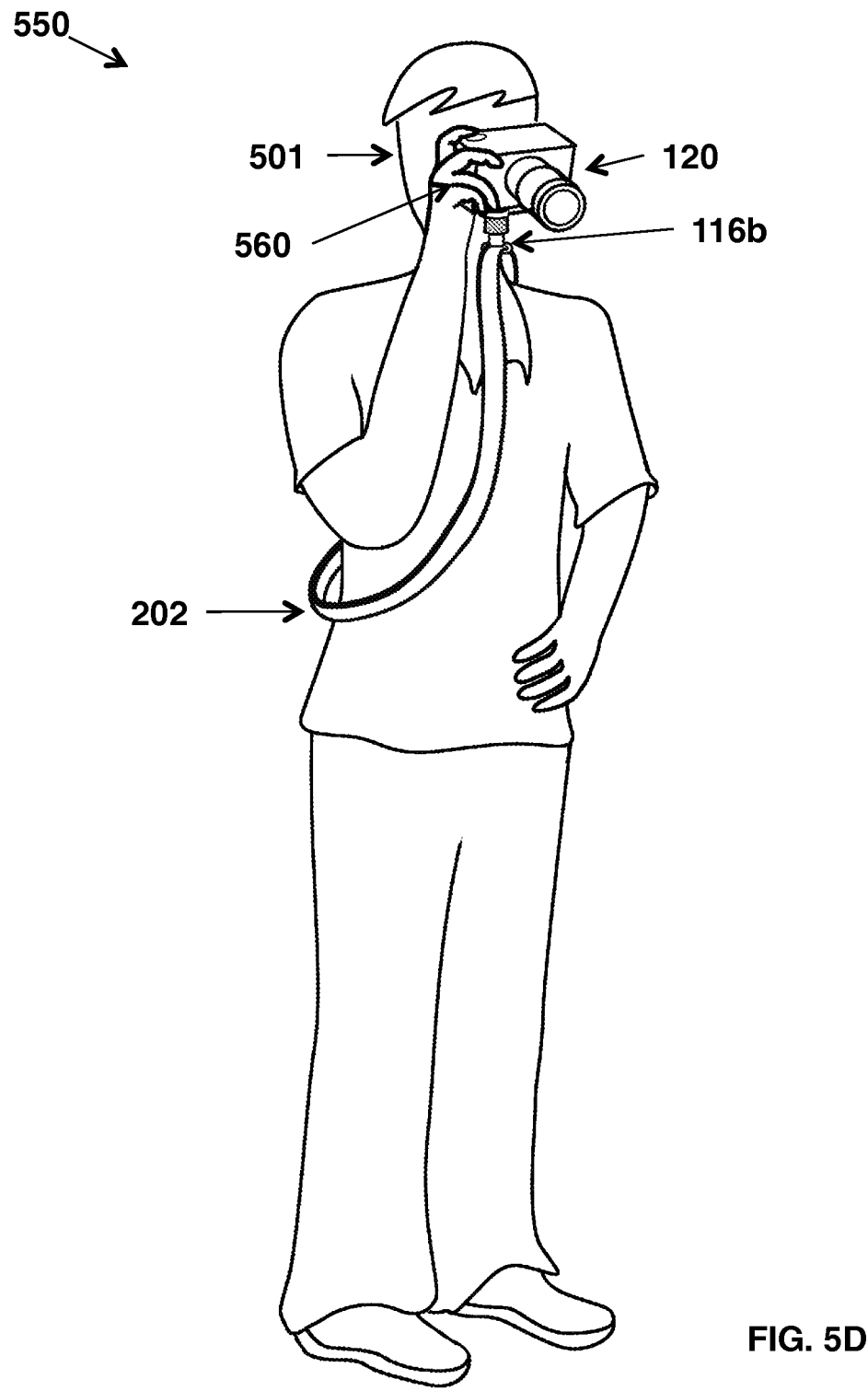

FIG. 5C is a front plan view 525 demonstrating that the user 501 can easily one-handedly grasp the camera 120 at 528, rotate it 180 degrees to hold the camera in correct orientation, i.e., the bottom of the camera is downwardly facing, and hold the camera in this orientation should the user either anticipate a photographic opportunity or in preparation to immediately take a picture. FIG. 5D is a front plan view 550 demonstrating the latter instance and showing that the user 501 has continued the upward motion to raise the camera to eye level at 560. Raising the camera to the eye may comprise one or both of sliding the strap receiving end 116b of the strap connector 114 along the length of the strap 202 or raising the camera to the eye at the position where the strap passes through the strap end. FIGS. 5A-5D clearly demonstrate that the camera can be used without having to release it from the camera transport system and that the camera transport system does not interfere with use thereof.

Figure 6A:
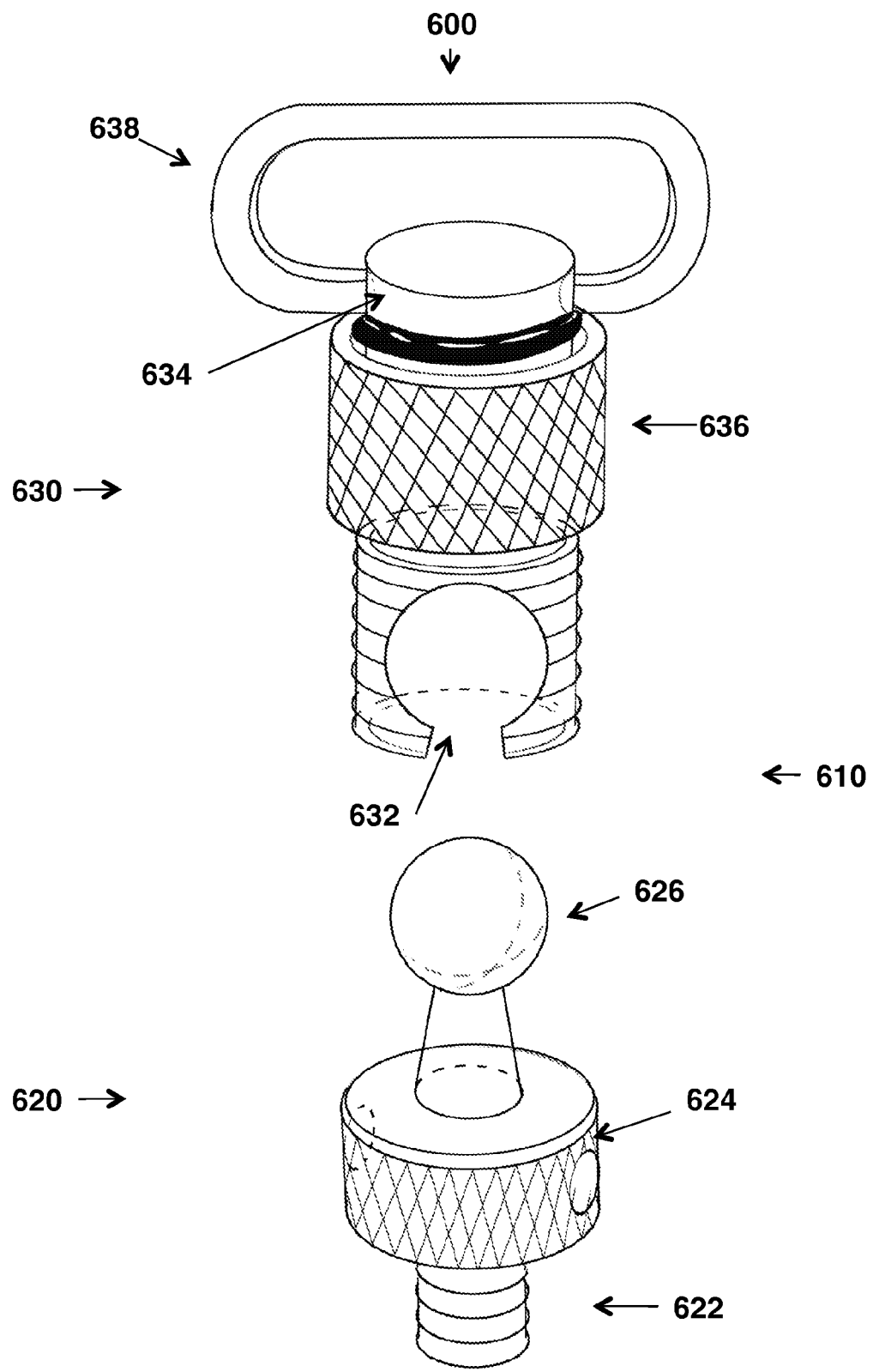
FIGS. 6A-6B are perspective views of the exploded (FIG. 6A) and the assembled (FIG. 6B) camera engagement device depicting the camera connecting component and the strap receiving component.
Figure 6B:
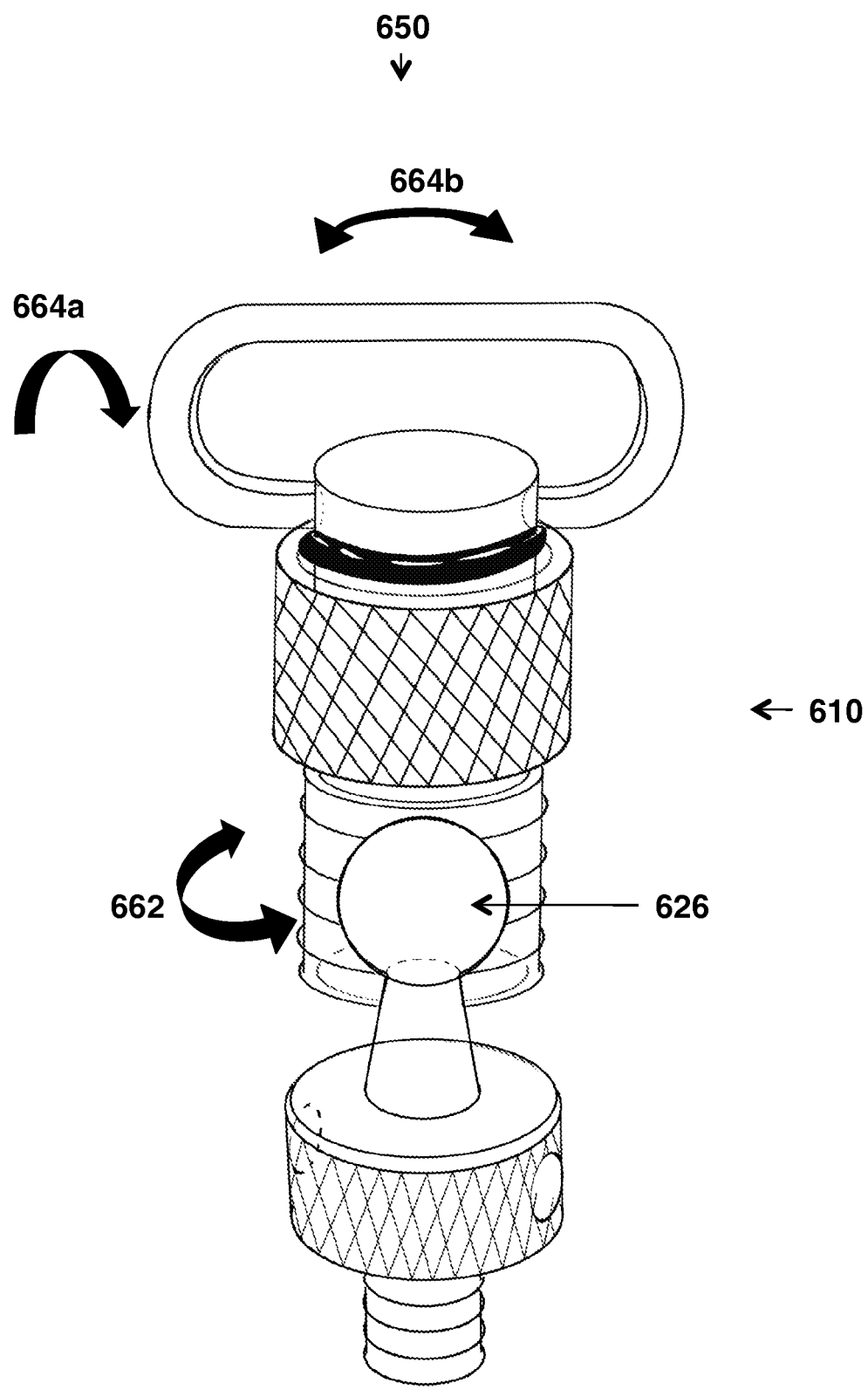

FIG. 6A is an exploded perspective view 600 of the camera engagement device 610. The device comprises two components, a camera connecting component 620 and a strap receiving component 630. The camera connecting component may be a ball connector having a threaded end 622 with nut 624 assembly and a ball end 626 to connect to the strap receiving component. The strap receiving component has an exteriorly threaded socket end 632 configured to receive the ball end of the ball connector, a strap receiving end 634 for slidably passing a strap 802 therethrough (see FIG. 8A) and an interiorly threaded sleeve 636 disposed to threadably downwardly engage the socket upon its receiving the ball end therein. The strap end comprises a strap receiving means 638 through which the strap is received. FIG. 6B is a perspective view 650 of the assembled camera engagement device 610. The view illustrates how the strap receiving component receives the ball end 626 of the camera connecting component 620 with the sleeve 638 at the strap receiving end 634. The ball end is securely and rotatably confined within socket 634 of the strap receiving component 630. As is generally known and standard in the art of ball connectors, the ball end provides a point around which the strap receiving component can pivot 360 degrees at 662 and/or tilt to and fro at 664a or side to side at 664b.

Figure 7:
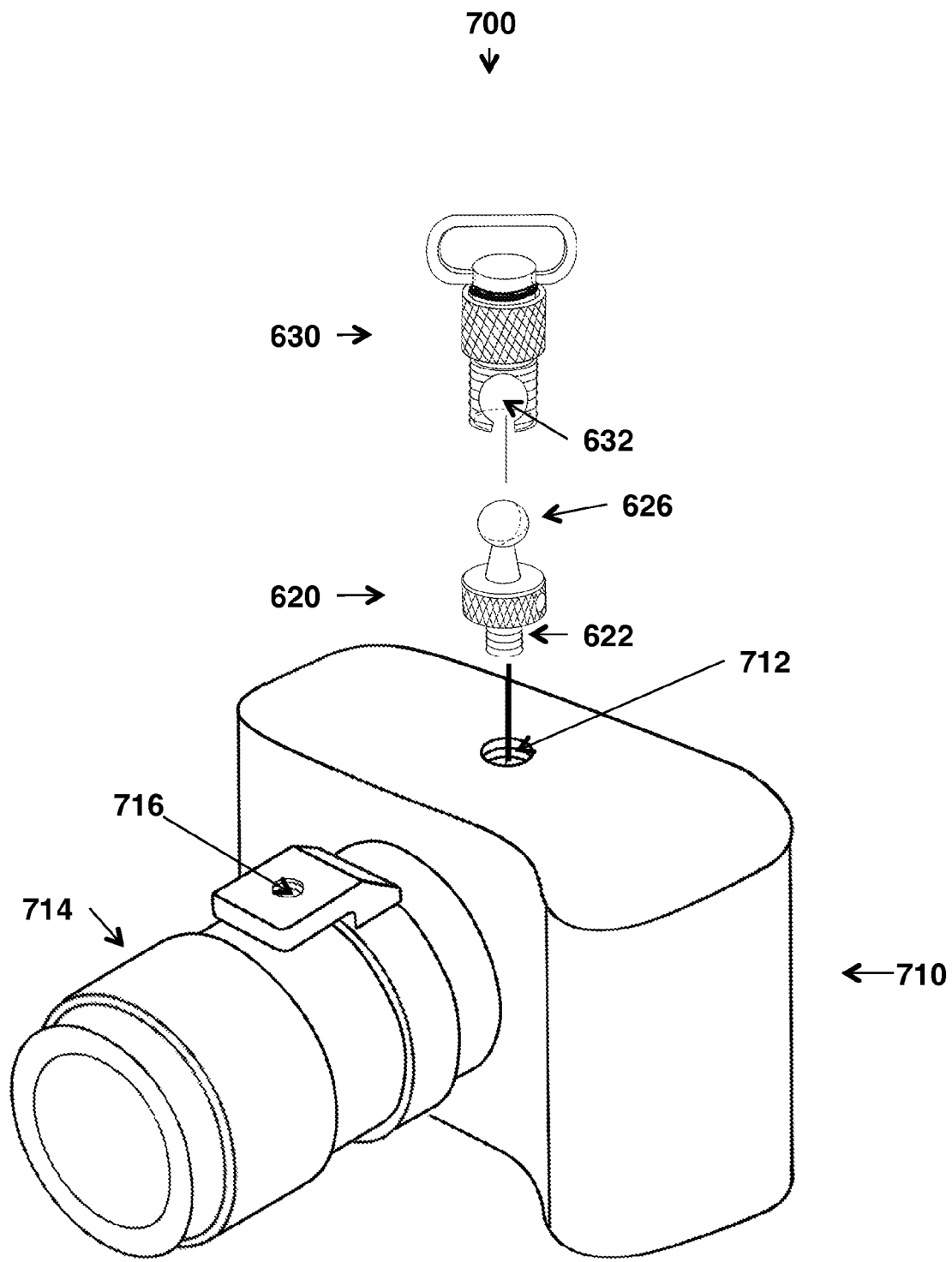
FIG. 7 is a perspective view of the exploded camera engagement device as aligned with the attachment point on a camera.

With continued reference to FIG. 6A, FIG. 7 is a perspective view 700 of the exploded camera engagement device 610 as aligned with a threaded camera attachment point 712 on the bottom surface of the camera 710. The threaded end 622 of the camera connecting component or ball connector 620 is aligned to threadably engage the threaded camera attachment point. The socket end 632 on the strap receiving component 630 aligns with the ball end 626 of the ball connector, as described. In this configuration, the camera comprises a lens 714 which has an attachment point 716 on the underside of the lens to threadably engage a suitable tripod or other support or mounting means. While the camera engagement device and system described herein is designed to carry and secure a camera for manual use while the camera is worn by a user, the configuration of the camera engagement device does not interfere with the user's mounting or securing the camera to a tripod, etc.

Figure 8A:
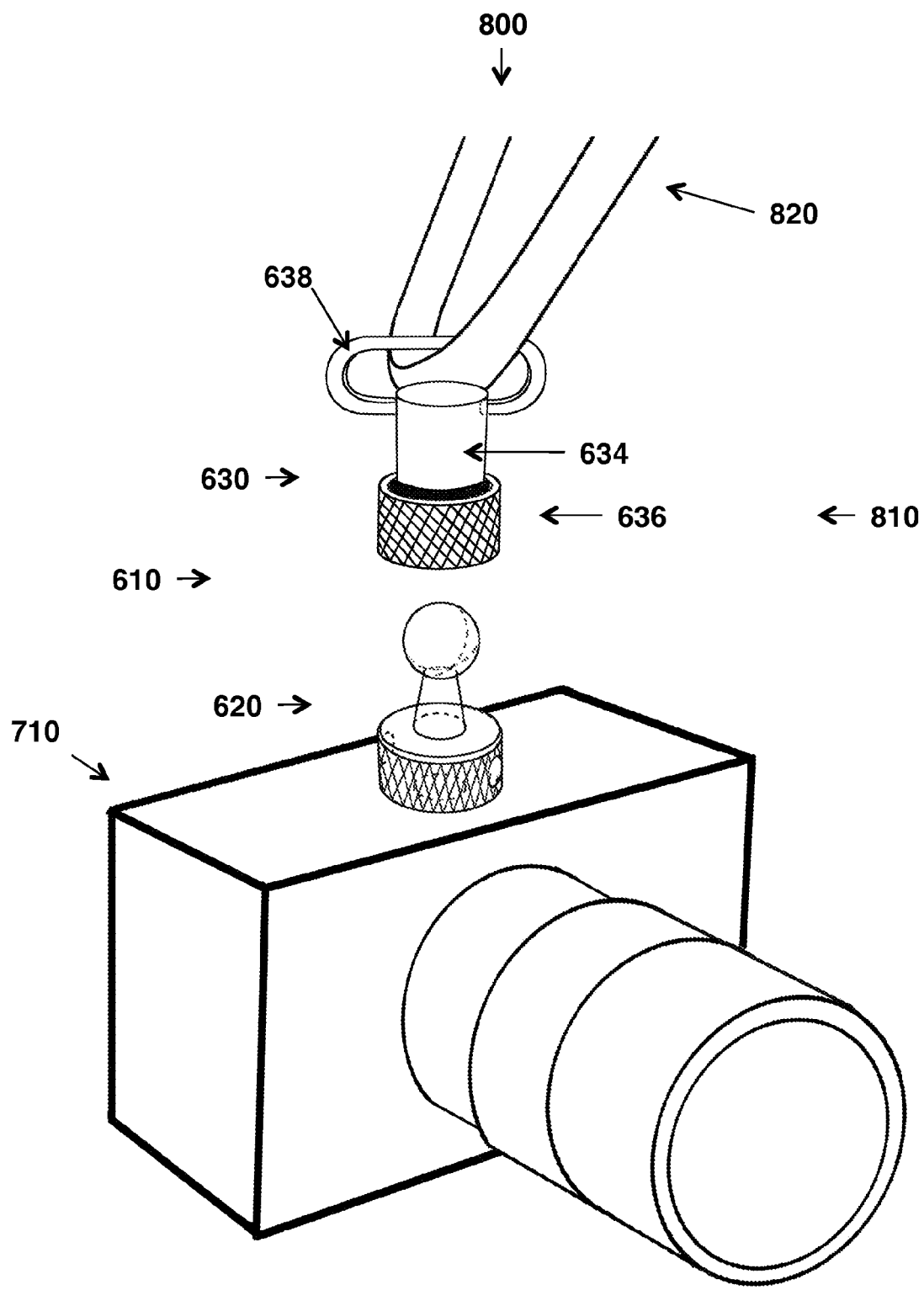
FIGS. 8A-8B depict the camera engagement system showing the strap receiving component with strap in alignment with the camera connecting component in engagement with the camera attachment point on the camera (FIG. 8A) and the strap receiving component with strap assembled with the camera connecting component (FIG. 8B).
Figure 8B:
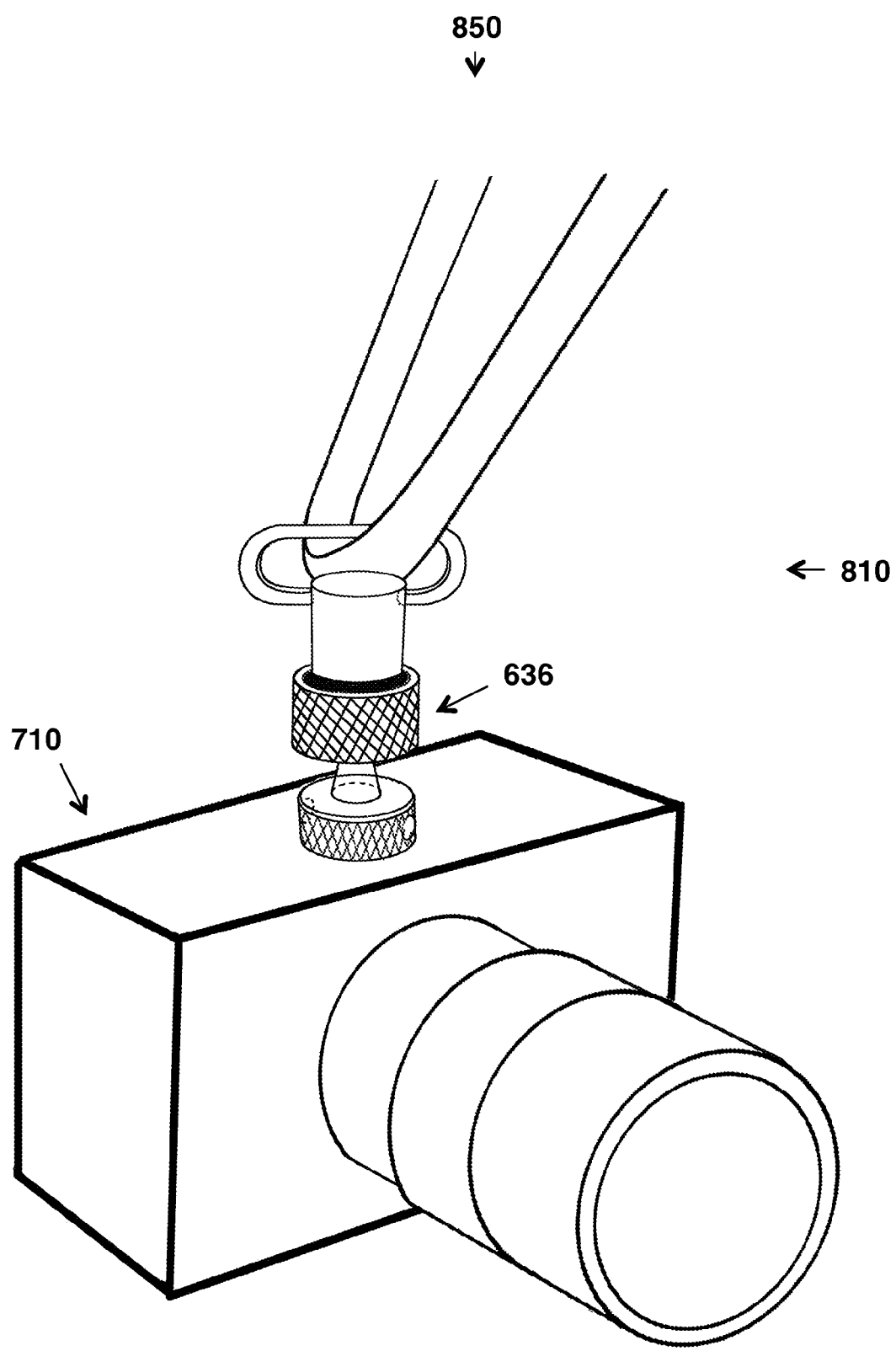

With continued reference to FIGS. 6A and 7, FIG. 8A is an exploded view 800a of the camera transport system 810. In addition to the camera engagement device 610, the view depicts a portion of a strap 820 slidably received through the strap receiving means 638 of the strap receiving component 630. In this configuration the sleeve 636 is depicted as threadably engaging the socket end 632 thereby better illustrating the strap receiving end 634. The strap receiving component is aligned to receive the ball end 626 of the camera connecting component or ball connector 620. The threaded end 622 of the camera connecting component is threadably engaged with the threaded camera attachment point 712, as shown in FIG. 7, on the bottom surface of the camera 710. With continued reference to FIGS. 6B and 7, FIG. 8B is a view 800b of the camera transport system 810 assembled on the camera 710. The view illustrates the positioning of the interiorally threaded sleeve 636 in threaded engagement with the exteriorly threaded socket 632 which contains the ball end 626 therein, as shown in FIG. 6B.

Figure 9A:
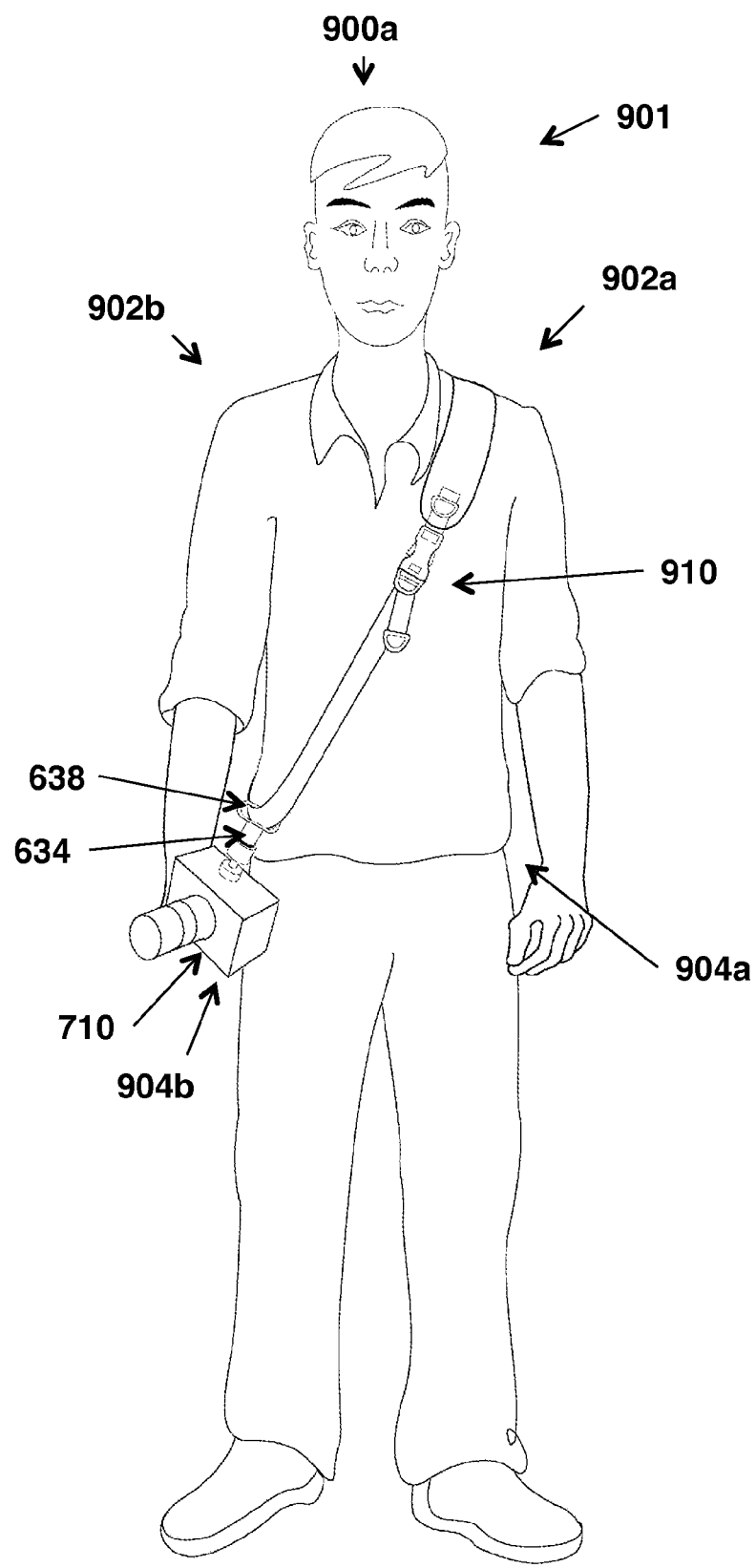
FIGS. 9A-9B depict the camera engagement system as worn by a user of the camera.
Figure 9B:
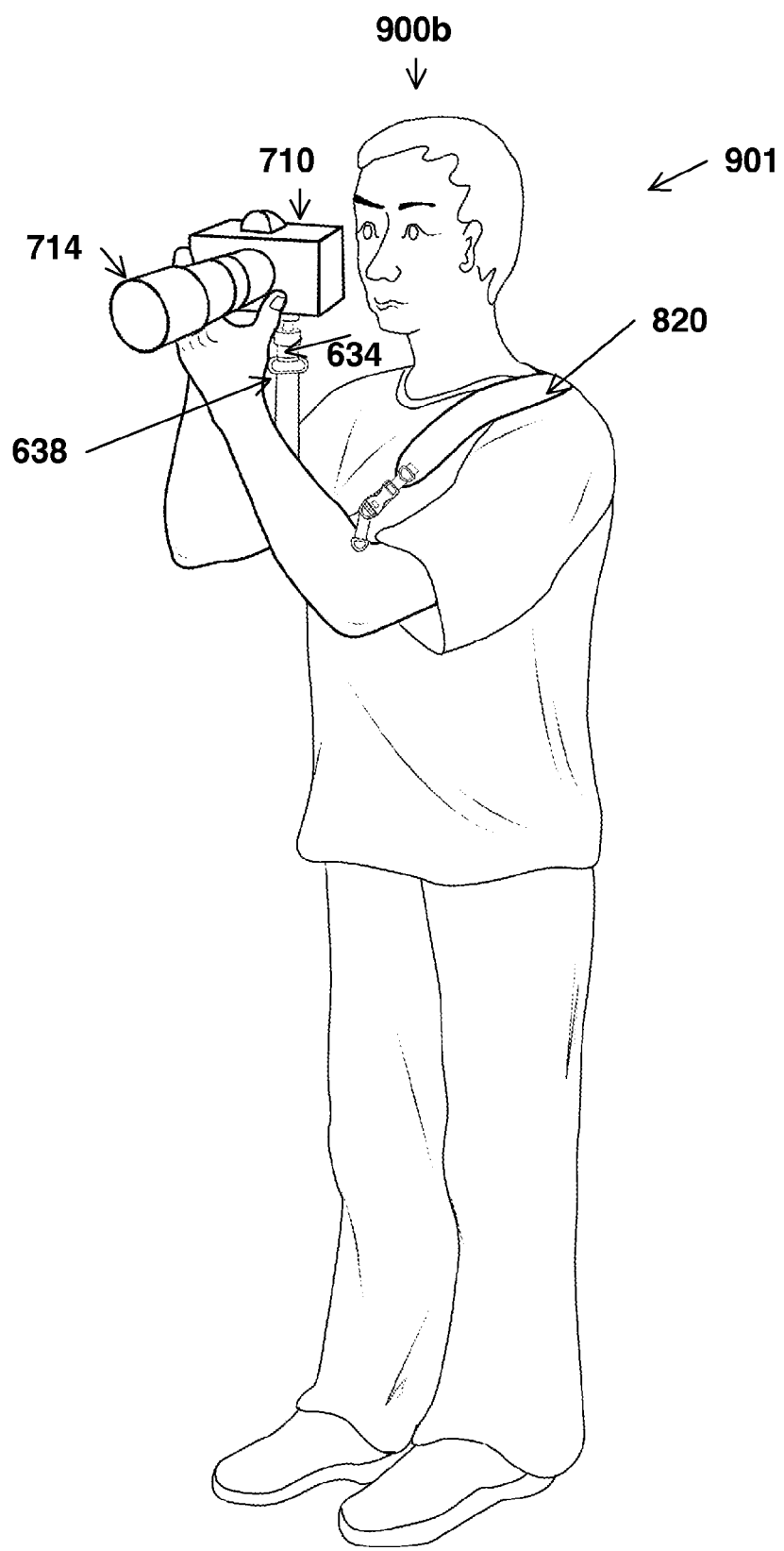

With continued reference to FIGS. 8A-8B, FIGS. 9A-9B depict the camera transport system 810 in front plan views 900a,b as worn and used by a user 901. The strap 820 may be worn over the shoulder 902 to cross the chest whereby the camera 710 engaged with the camera engagement device 610 rests in the area of the right hip 904b. The strap slidably passes through the strap receiving means 638 of the strap receiving end 634 and may be adjusted at 910, for example, lengthened or shortened, as suits each individual user, so that the camera rests comfortably and securely against the user. As depicted, the camera transport system is assembled for easier use by a right-handed person. However, because the camera can be rotated via the ball and socket configuration in the camera engagement device, the camera transport system readily accommodates a left-handed person where the strap is worn over right shoulder 902b and across the chest and the camera rests against the left hip 904a. View 900b in FIG. 9B illustrates that the right-handed user 901 can easily raise the camera 710 to eye level with the right hand while adjusting the camera lens 714 with the left hand or vice versa for a left-handed user. Raising the camera to the eye may comprise one or both of sliding the strap receiving means 638 of the strap connecting end 634 along the length of the strap 820 or raising the camera to the eye at the position where the strap passes through the strap receiving means.

Figure 10:
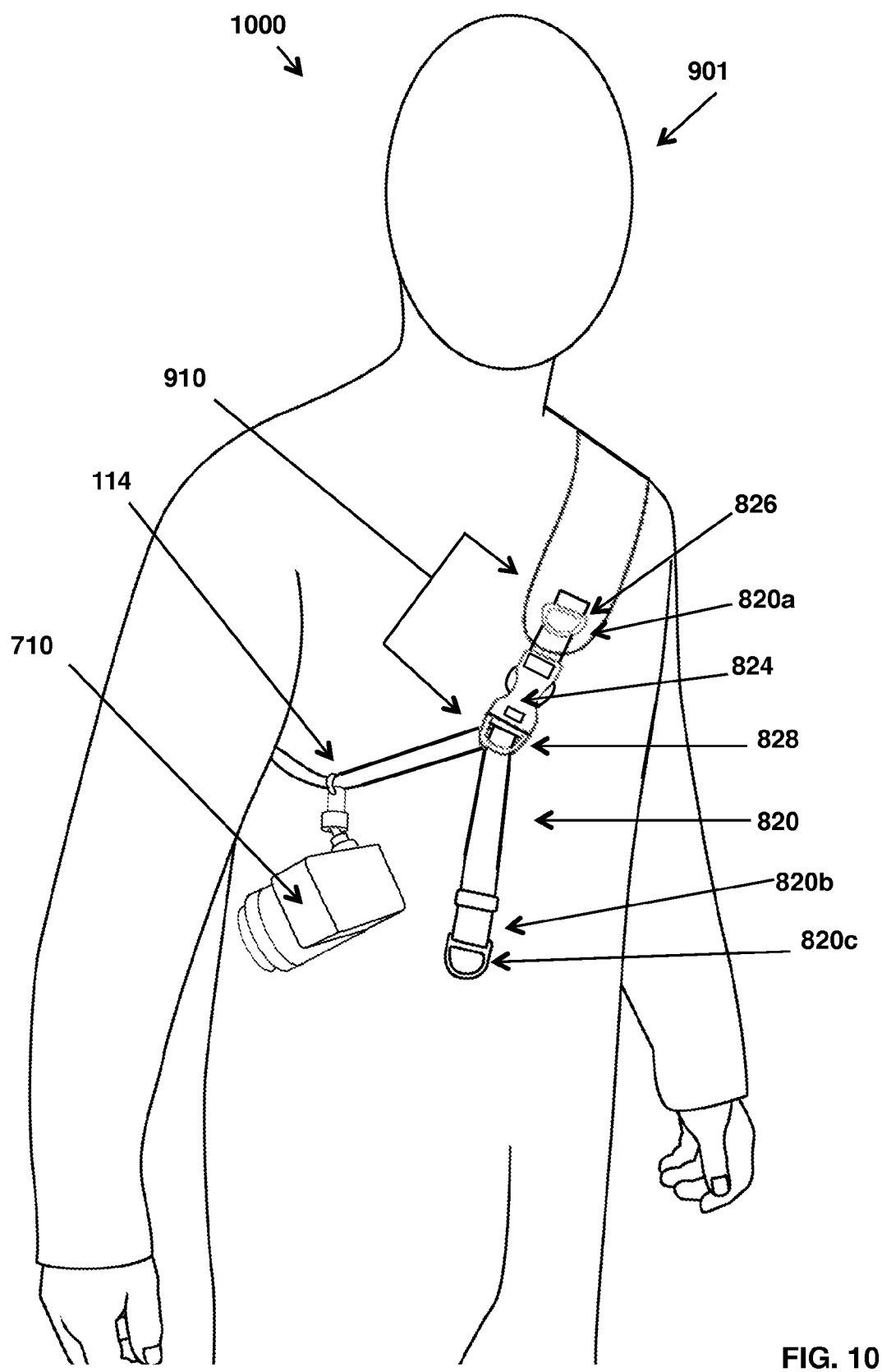
FIG. 10 illustrates the quick adjustability of the camera strap in FIG. 9A and depicts the change in position of the camera after the strap is shortened.

With continued reference to FIG. 9A, FIG. 10 depicts how the strap 820 is quickly adjusted at 910 in front view 1000. The strap generally comprises a shoulder pad 822 having a safety buckle 824 and a D-ring 826 independently attached at the front end 820a thereof. A slide 828 is attached to the safety buckle. The end 820b of the strap, which optionally may comprise a pull 820c attached thereto, is slidably threaded through the slide such that the strap end or strap pull is easily grasped by a user 901. A downward pulling motion on the strap end or pull will raise the camera 710, attached via a strap connector 114 to the strap, upwardly by shortening the length of strap across the chest. Pulling the strap back through the slide will lengthen the strap.

Figure 11A:
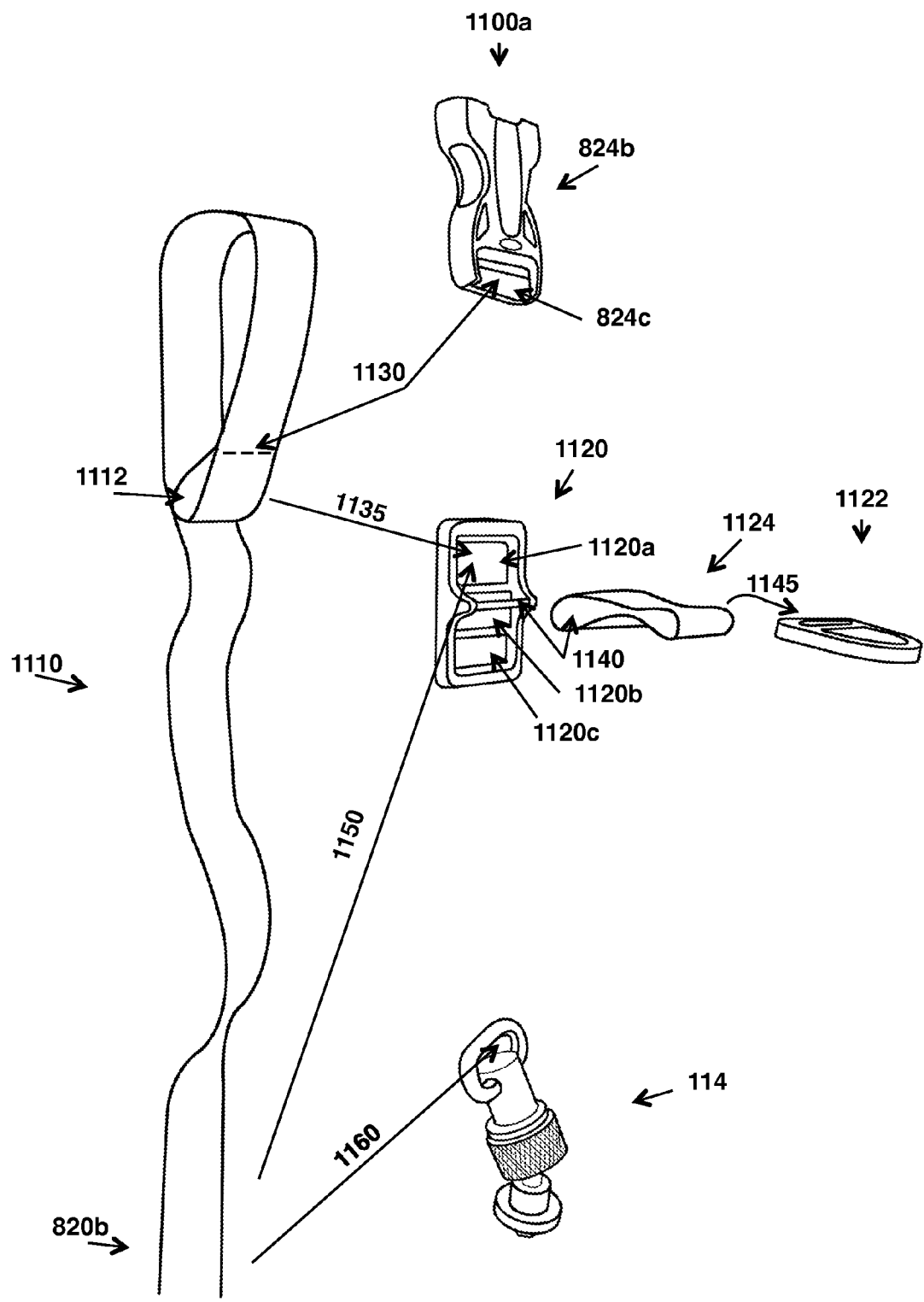
FIGS. 11A-11B are exploded (FIG. 11A) and assembled (FIG. 11B) views of a quick adjustment component of another adjustable camera strap.
Figure 11B:
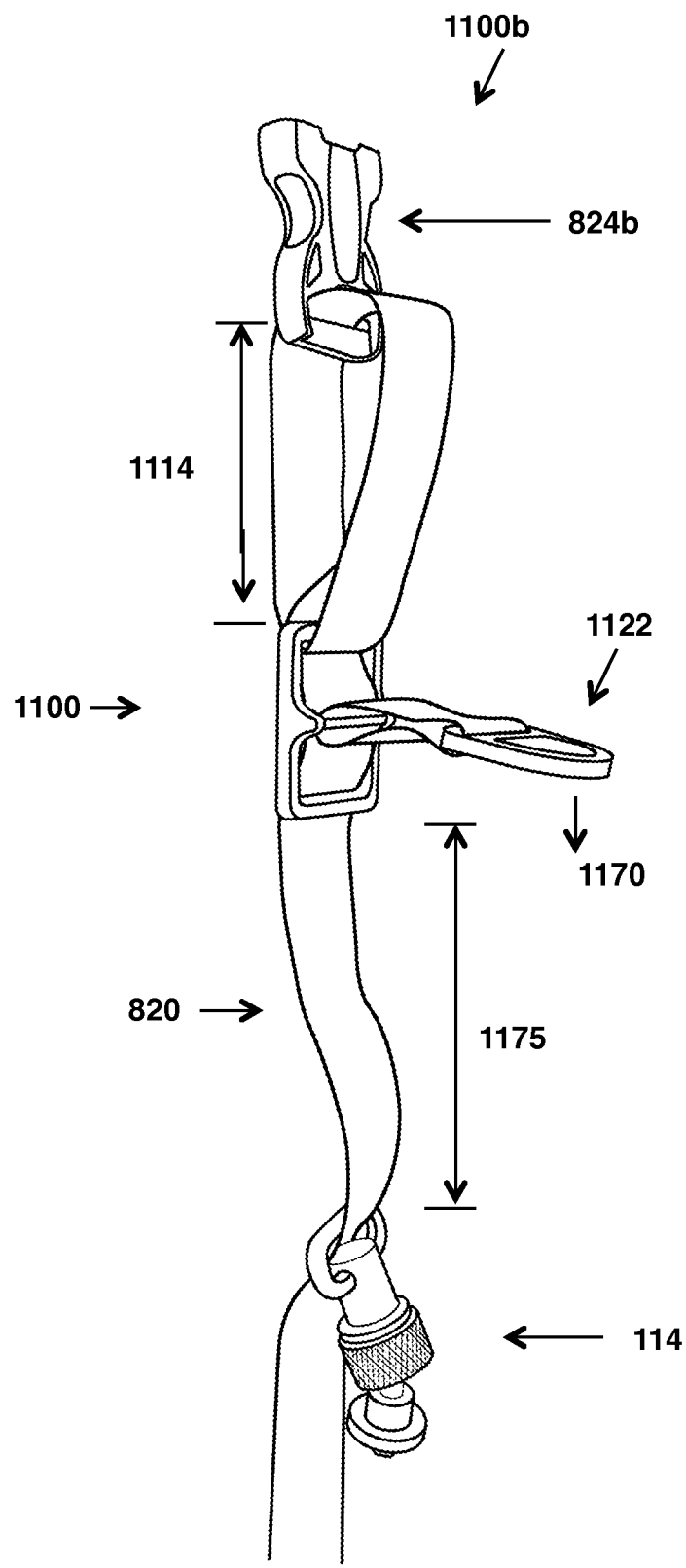

With continued reference to FIG. 10, FIGS. 11A-11B depict an alternate quick adjustment strap in exploded 1100a and assembled 1100b views. In FIG. 11A the quick adjustment component 1110 of the strap comprises a closed strap loop end 1112, the prong receiving component 824b of the safety buckle 824, and a slide 1120. The slide has a pull 1122 linked thereto via any known attachment means, such as, but not limited to, a closed loop 1124 of strong, flexible material, such as a webbing material. The strap loop end is slidably passed through the open end 824c of the prong receiving component at 1130 and closed around the upper end of the slide at 1135. The webbing loop 1124 is looped through the slide at 1140 and through the pull at 1145. The distal non-looped end 820b of the strap 820 is slidably passed or woven through the separate slide portions 1120a,b,c in an over and under manner as is known and standard in the art at 1150. The strap end 820b also is slidably received through the strap connector 114 at 1160. The strap connector can be threadably connected to a camera 710 (see FIG. 10).

FIG. 11B shows the assembled adjustment component 1110 of the strap 820. In use, the prong receiving end 824b would be mated with the prong end (not shown) of the safety buckle 824 to buckle the strap across the chest of a user (see FIG. 9A or 10). One can easily see that by pulling downwardly on the slide pull 1122 at 1170, the slide 1120 will travel down the strap toward the strap connector 114. This results in the effective across the chest length of the strap being shortened along 1175 by increasing the size of the loop formed at 1114 between the slide and the safety buckle. Pulling the slide pull back up the strap along 1175 toward the safety buckle decreases the loop formed at 1114 thereby increasing the effective length of the strap.

The strap and adjustable component thereof and the slide loop may comprise any known material standard in the art, for example, a webbing material with about a one-inch width. The safety buckle may be, but not limited to, a three-button quick release safety buckle or a side-release safety buckle, may comprise a plastic material, as is known and standard in the art, and has dimensions to accommodate the strap loop. The slide and D-ring also may comprise known materials and have dimensions to accommodate the strap and the glide loop, respectively. For example, but not limited to such, the straps and webbing material may have a width of about 1 inch.

With continued reference to FIGS. 9A, 10, and 11B, FIGS. 12A-12B depict a second adjustable strap to be used in a double connection system for supporting and transporting a camera with a lens attached. FIG. 12 depicts the second strap 1200 which comprises parts 1210 and 1220 connectable via a safety buckle 1230, which can be the same type as safety buckle 824. Strap part 1210 comprises a strap 1212, a snap hook 1214, a slide 1216 and the prong end 1230a of the safety buckle 1230. The strap 1212 has a first end 1212a looped through a D-ring like end 1214a of the snap hook. A second strap end 1210b of the strap section 1212 is slidably passed or woven through the slide portions (not shown) of the slide 1216 in an over and under manner as is known and standard in the art and is slidably passed through the open end 1230c of the prong component 1230 and closed around the lower end of the slide. The slide 1216 may be the same type as slide 1120. Strap part 1220 comprises the prong receiving component 1230b, a loop 1222 of strong, flexible material, such as a webbing material, a first D-ring 1224a, a thin, flexible band 1226 and a second D-ring 1224b with a screw 1228. The webbing loop 1222 loops through the open end 1230d of the prong receiving component 1230b and through the first D-ring 1224a. The webbing loop may be stitched closed at 1222a,b to secure the safety buckle component 1230b and the first D-ring 1224 or, optionally, may be left unstitched. The flexible band 1226 may be a closed loop cord and is secured to the first and second D-rings in any appropriate manner, such as with a knot, e.g., a Prusik knot. Similarly to FIG. 11B, sliding the slide up the strap along 1240 will decrease or shorten the effective length of the strap part 1210 while reversing the sliding action back along 1240 will increase or lengthen the strap segment. When the prong end 1230a is mated with the prong receiving component 1230b, parts 1210 and 1220 are joined to form the second adjustable strap 1200.

Figure 12A:
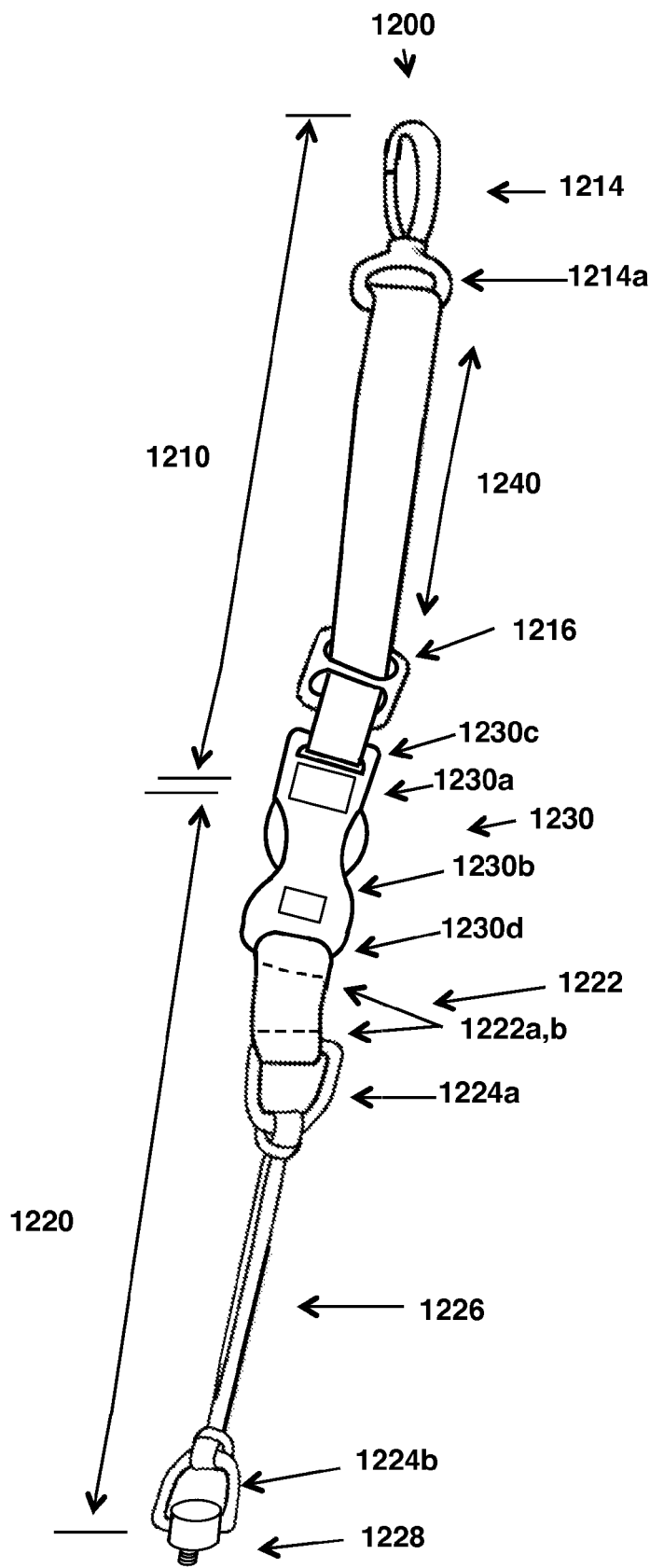
FIGS. 12A-12B depict a double strap connection system for supporting a long telephoto lens.
Figure 12B:
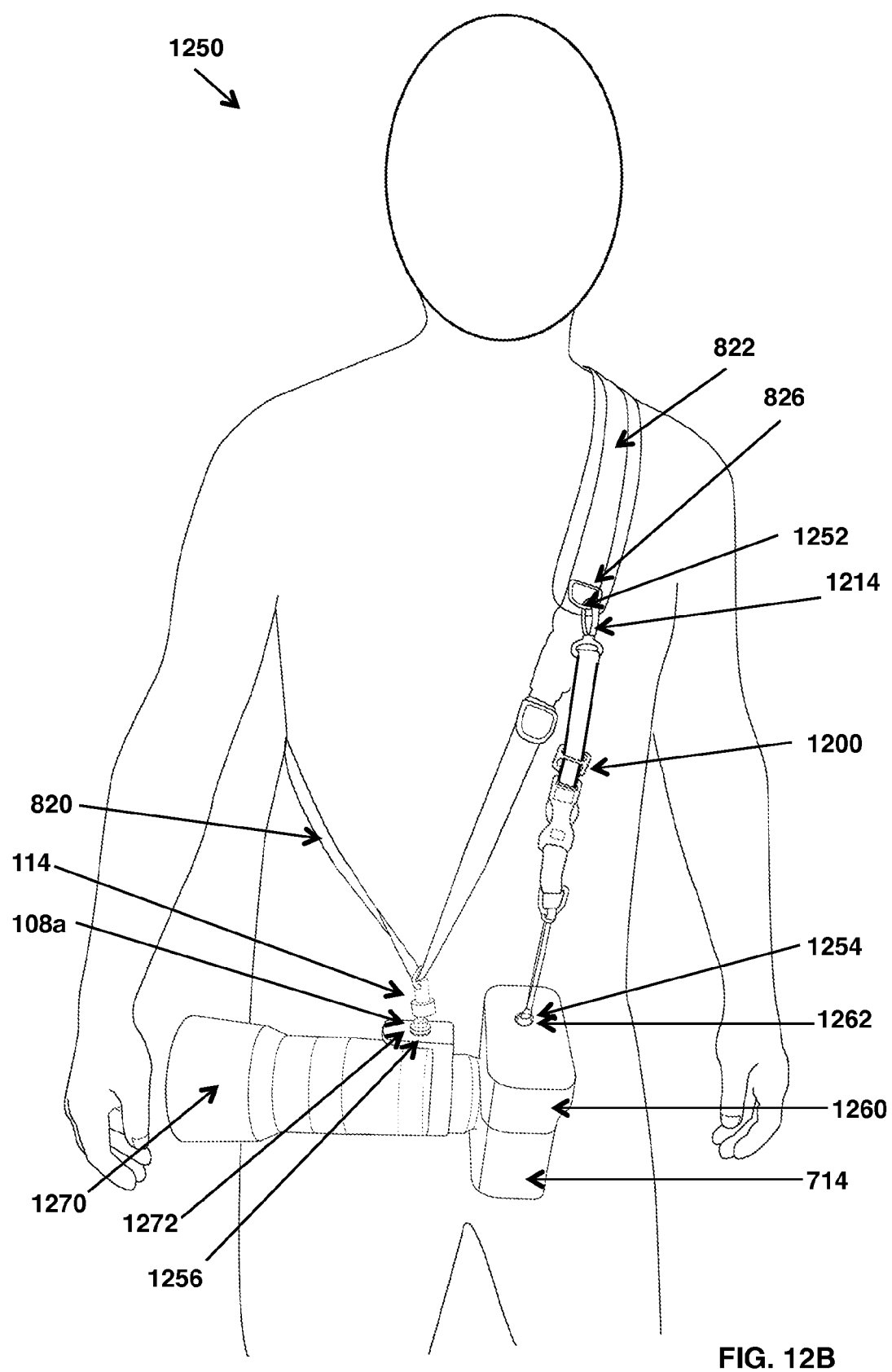

FIG. 12B illustrates a connection system 1250 for securing and transporting a camera and lens combination. The strap 820 can comprise any quick adjustment component described herein, such as 910 or 1110, and is depicted as a broad rendering. However, specifically depicting the D-ring 826 on the shoulder pad 822 and the strap connector 114 which comprise connection points in the system are specifically depicted. In the double connection system, the snap hook 1214 of the second adjustable strap 1200 is hooked to the D-ring 826 on the shoulder pad of the first adjustable strap 820 at a first connection point 1252. A second connection point 1254 is formed when the screw 1228 of the second D-ring 1224b threadably engages an attachment point 1262 on the bottom surface of a camera hand grip 1260 which itself is threadably engaged to a camera attachment point on the bottom surface of a camera 714, such as depicted at 120a (see FIG. 1A). Alternatively, the camera hand grip may be removed and the D-ring screw may directly, threadably engage the camera attachment point (see FIG. 13A). A third connection point 1256 is formed when the threaded end 110a of a ball connector 108a threadably engages a threaded attachment point on a mount system 1272 affixed to the long telescopic camera lens 1270 and the ball end 112a of the ball connector engages the socket 116a comprising the strap connector 114 through which the strap 820 is slidably passed.

The connection system enables a camera with a heavy lens to be comfortably and adjustably positioned upside down and pointing backwards so that a user 901 can quickly grab the hand grip or camera when a photographic opportunity presents itself. The adjustability of the first and second straps allows the user to quickly and easily position the camera and lens to a desired position for transport, for example, higher up on the chest away from the hips while the user is walking. However, the straps can be quickly lengthened if needed to use the camera.

Figure 13A:
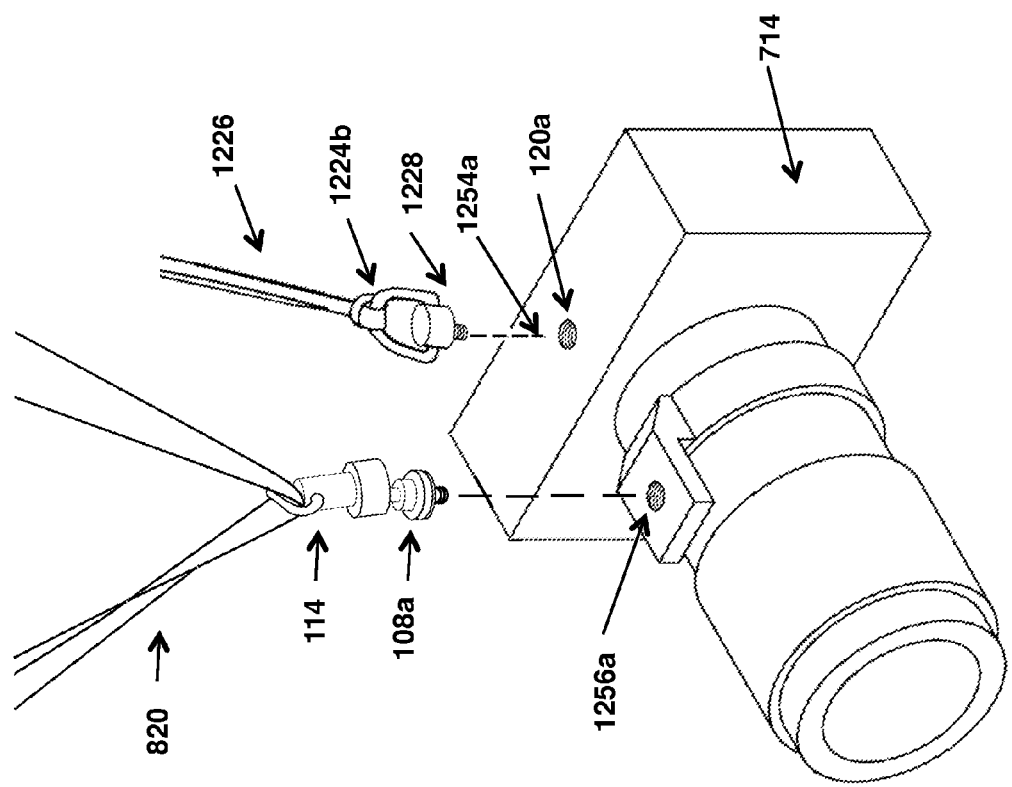
FIGS. 13A-13B depict alternate double strap connection means for a camera and lens.
Figure 13B:
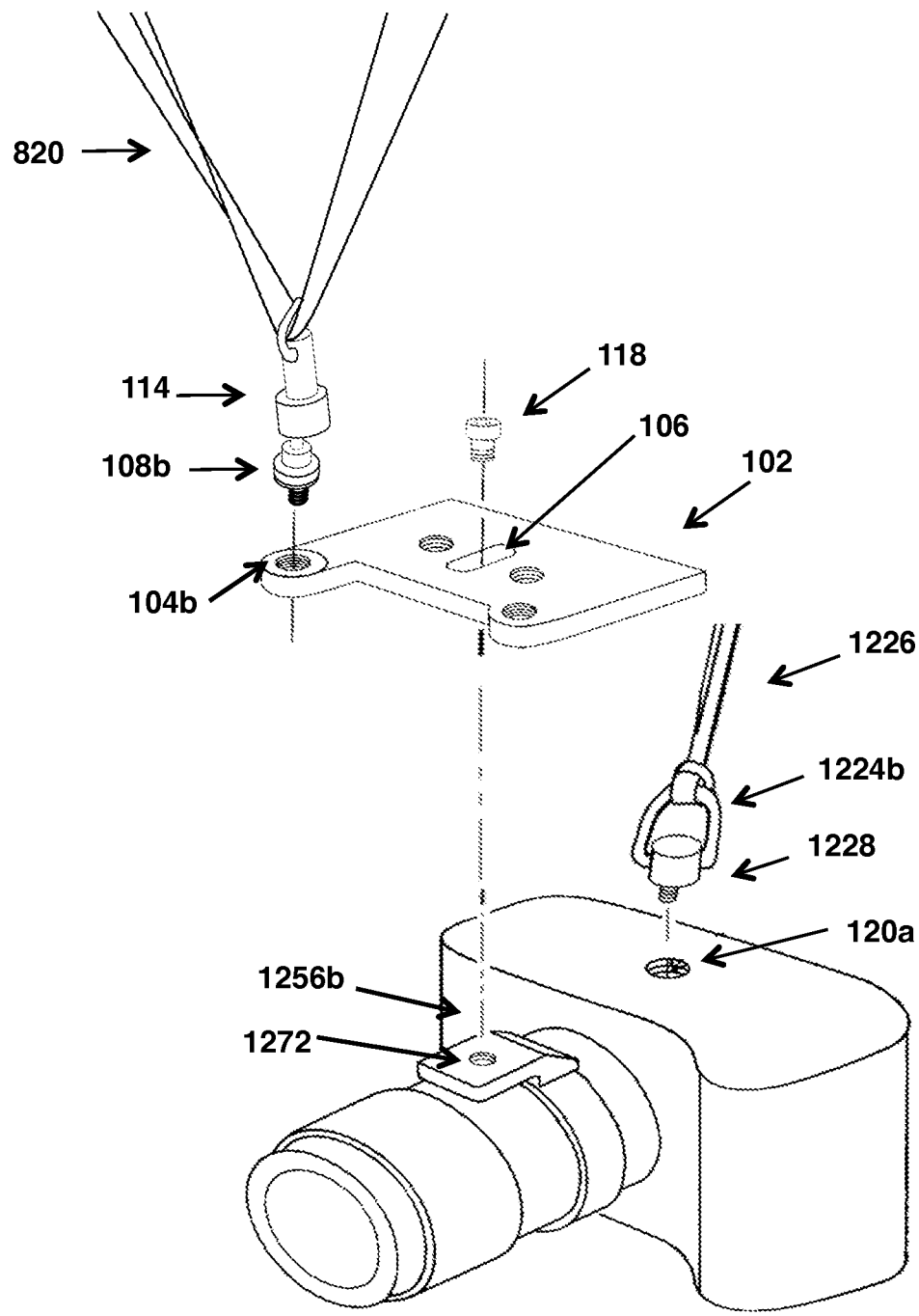

With continued reference to FIGS. 12A-12B, FIGS. 13A-13B illustrate alternative connection systems. In FIG. 13A, the screw 1228 of the second D-ring 1224b may directly threadably engage a camera attachment point 120a on a camera. In FIG. 13B, mount plate 102 may engage the attachment point 1272 of the lens mount system 1270 via screw 118 through slot 106. The threaded end 110a of ball connector 108a threadably engages a threaded opening 104b through the mount plate. The strap connector 114 is connected to the ball connector as described in FIG. 12A.

Any patents or publications mentioned in this specification are indicative of the levels of those skilled in the art to which the invention pertains. Further, these patents and publications are incorporated by reference herein to the same extent as if each individual publication was specifically and individually incorporated by reference. One skilled in the art will readily appreciate that the present invention is well adapted to carry out the objects and obtain the ends and advantages mentioned, as well as those inherent therein. It will be apparent to those skilled in the art that various modifications and variations can be made in practicing the present invention without departing from the spirit or scope of the invention. Changes therein and other uses will occur to those skilled in the art which are encompassed within the spirit of the invention as defined by the scope of the claims.

What is claimed is:

1. A system for engaging and transporting a camera with a removable lens, comprising:
   a first adjustable strap in combination with a second strap comprising means for securely engaging the camera, said first adjustable strap having a shoulder pad end and a strap end connected via a safety buckle, wherein said shoulder pad end comprises means for removably connecting to the second strap and said strap end comprises a slide disposed thereon;
   a strap receiving component having a strap receiving end, a socket end threaded on an outer surface and a sleeve threaded on an inner surface movably disposed between the ends to threadably engage the outer surface of the socket end in covering relationship, said strap end slidably received through the strap receiving end; and
   a ball connector having a ball end received within the socket end and a threaded end configured to engage an attachment point on the lens.

2. The system of claim 1, wherein a prong end of the safety buckle is affixed to the shoulder pad end and a prong receiving end of the safety buckle is affixed to the slide or to a loop formed in a portion of the strap end of the first adjustable strap.

3. The system of claim 2, wherein the prong receiving end of the safety buckle is affixed to the slide, said strap end of the first adjustable strap pullable through the slide in a length-adjusting relationship.

4. The system of claim 3, wherein the prong receiving end of the safety buckle is affixed independently to the loop formed in a portion of the strap end and to the slide, said slide receiving a non-looped portion of the strap end of the first adjustable strap therethrough, said slide movable along the non-looped portion in a length-adjusting relationship.

5. The system of claim 1, wherein the means for removably connecting to the second strap is a D-ring.

6. The system of claim 1, further comprising:
a mount plate with a plurality of threaded openings and a slot therethrough, said ball connector threadably received in one of the plurality of threaded openings and said mount plate threadably engaging the lens attachment point via a screw through the slot.

7. The system of claim 1, wherein the second strap comprising the camera engaging means is an:
adjustable strap comprising:
a first adjustable strap part and a second strap part connected via a safety buckle, said first adjustable strap part comprising a slide movably disposed along the same in a length-adjusting relationship;
means for removably connecting the first adjustable strap part to the first adjustable strap; and
means for removably connecting the second strap part to an attachment point on the camera or on an accessory attached to the camera attachment point.

8. The system of claim 7, wherein the accessory is a camera hand grip.

9. The system of claim 7, wherein a prong end of the safety buckle is affixed to a second end of the first adjustable strap part and a prong receiving end of the safety buckle is affixed to a first end of the second strap part.

10. The system of claim 7, wherein the means for removably connecting to the first adjustable strap is a snap hook affixed at a first end of the first adjustable strap part.

11. The system of claim 7, wherein the means for removably connecting to the attachment point is a D-ring with screw affixed at a second end of the second strap part.

12. A camera strap system, comprising:
a first adjustable strap having a shoulder pad end and a strap end connected via a first safety buckle affixed to both of said ends, said shoulder pad end comprising a connecting ring and said strap end comprising a first slide disposed on the strap end; and
a second adjustable strap having a first adjustable strap part and a second strap part connected via a second safety buckle affixed to both of said parts, said first adjustable strap part comprising a snap hook removably connected to the connecting ring and a second slide movably disposed on the first adjustable strap part and said second strap part comprising a connecting ring with screw combination.

13. The camera strap system of claim 12, wherein a prong end of the first safety buckle is affixed to the shoulder pad end of the first adjustable strap and a prong receiving end of the first safety buckle is affixed to the first slide or to a loop formed in a portion of the strap end of the first adjustable strap.

14. The system of claim 13, wherein the prong receiving end of the first safety buckle is affixed to the first slide, said strap end of the first adjustable strap pullable through the first slide in a length-adjusting relationship.

15. The system of claim 13, wherein the prong receiving end of the first safety buckle is affixed independently to the loop formed in a portion of the strap end and to the first slide, said first slide receiving a non-looped portion of the strap end of the first adjustable strap therethrough, said first slide movable along the non-looped portion in a length-adjusting relationship.

16. The system of claim 12, wherein a prong end of the second safety buckle is affixed to a second end of the first adjustable strap part and a prong receiving end of the safety buckle is affixed to a first end of the second strap part.

17. The camera strap system of claim 12, wherein the first adjustable strap further comprises:
a strap receiving component having a strap receiving end, a socket end threaded on an outer surface and a sleeve threaded on an inner surface movably disposed between the ends to threadably engage the outer surface of the socket end in covering relationship, said second strap end of the first adjustable strap slidably received through the strap receiving end; and
a ball connector having a ball end received within the socket end and a threaded end configured to engage an attachment point on a camera or an attachment point on an accessory attached to the camera.

18. The system of claim 17, wherein the accessory is a lens or a camera hand grip.

19. The system of claim 17, wherein the first adjustable strap further comprises:
a mount plate with a plurality of threaded openings and a slot therethrough, said ball connector threadably received in one of the plurality of threaded openings and said mount plate threadably engaging the attachment point via a screw through the slot.

* * * * *